United States Patent
Mifsud et al.

(10) Patent No.: US 7,894,920 B2
(45) Date of Patent: Feb. 22, 2011

(54) INFORMATION TECHNOLOGY PROCESS FOR PREFABRICATED BUILDING PANEL ASSEMBLY

(75) Inventors: Vincent D. Mifsud, Oakville (CA); Giuseppe Corrado Aprile, Burlington (CA); Michael J. Churchill, Oakville (CA); Michele Tancredi, St. George (CA)

(73) Assignee: Genesis TP, Inc., Vaughan, Ontario (CA)

( * ) Notice: Subject to any disclaimer, the term of this patent is extended or adjusted under 35 U.S.C. 154(b) by 0 days.

(21) Appl. No.: 11/707,765

(22) Filed: Feb. 16, 2007

(65) Prior Publication Data

US 2007/0265724 A1  Nov. 15, 2007

Related U.S. Application Data

(60) Provisional application No. 60/791,982, filed on Apr. 14, 2006.

(51) Int. Cl.
*G06F 19/00* (2006.01)

(52) U.S. Cl. ............... 700/95; 700/98; 700/115; 700/227

(58) Field of Classification Search ............ 700/95–98, 700/106, 107, 115–117, 169, 180, 182, 227, 700/229
See application file for complete search history.

(56) References Cited

U.S. PATENT DOCUMENTS

| | | | |
|---|---|---|---|
| 672,788 A | 4/1901 | Lieber et al. | |
| 1,765,023 A | 6/1930 | McWane | |
| 2,198,652 A | 4/1940 | Cullen et al. | |
| 2,375,747 A | 5/1945 | Brown | |
| 3,304,675 A | 2/1967 | Graham-Wood et al. | |
| 3,415,367 A | 12/1968 | Lynch | |
| 3,431,619 A | 3/1969 | Bowers, Jr. | |
| 3,530,571 A | 9/1970 | Perry | |
| 3,574,921 A | 4/1971 | Fiegel et al. | |
| 3,683,581 A | 8/1972 | Yamoso | |
| 3,735,464 A | 5/1973 | Linzmeier et al. | |
| 3,744,031 A * | 7/1973 | Avery et al. ............ 700/160 |
| 3,827,203 A | 8/1974 | Berrie | |
| 3,835,620 A | 9/1974 | Boltz et al. | |
| 3,896,921 A | 7/1975 | Sund et al. | |
| 3,897,620 A | 8/1975 | Wright | |
| 3,915,298 A | 10/1975 | Adams et al. | |
| 3,979,864 A | 9/1976 | Tillie | |
| 4,007,833 A | 2/1977 | Bigelow, Jr. | |
| 4,035,010 A | 7/1977 | Kawashita et al. | |
| 4,228,626 A | 10/1980 | Trampe | |
| 4,360,110 A | 11/1982 | Sigman et al. | |
| 4,374,451 A * | 2/1983 | Miller ..................... 445/22 |
| 4,375,848 A | 3/1983 | Simpson et al. | |

(Continued)

FOREIGN PATENT DOCUMENTS

EP  0 308 837 B1  8/1992

(Continued)

*Primary Examiner*—Sean P Shechtman
(74) *Attorney, Agent, or Firm*—Perry + Currier, Inc.

(57) ABSTRACT

The disclosed technology enables manufacturers to efficiently design and manufacture structural wall panels, floor panels and roof panels from cold-formed steel for use in residential and commercial construction. The panels are individual components that can be installed at a building site to form a structure that includes walls, floor and a roof. Structures may be manufactured in a manufacturing facility and delivered to a construction site for installation.

9 Claims, 26 Drawing Sheets

U.S. PATENT DOCUMENTS

| | | |
|---|---|---|
| 4,496,063 A | 1/1985 | Ishii et al. |
| 4,525,965 A | 7/1985 | Woelfel |
| 4,637,179 A | 1/1987 | Bigelow, Jr. et al. |
| 4,700,472 A | 10/1987 | Muranaka |
| 4,730,718 A | 3/1988 | Fazio et al. |
| 4,842,473 A | 6/1989 | Zbornik |
| 4,880,099 A | 11/1989 | Leemkuil et al. |
| 4,937,768 A | 6/1990 | Carver et al. |
| 4,945,488 A | 7/1990 | Carver et al. |
| 4,956,764 A | 9/1990 | Carver et al. |
| 4,962,841 A | 10/1990 | Kloosterhouse |
| 4,967,520 A | 11/1990 | Post, Jr. et al. |
| 5,023,800 A | 6/1991 | Carver et al. |
| 5,033,014 A | 7/1991 | Carver et al. |
| 5,086,906 A | 2/1992 | Ludke |
| 5,152,050 A | 10/1992 | Kaczmarek et al. |
| 5,201,786 A | 4/1993 | Larsen |
| 5,203,073 A | 4/1993 | Kotake et al. |
| 5,359,871 A | 11/1994 | Morello |
| 5,381,915 A | 1/1995 | Yardley |
| 5,402,612 A | 4/1995 | diGirolamo et al. |
| 5,412,919 A | 5/1995 | Pellock et al. |
| 5,419,089 A | 5/1995 | Hill |
| 5,447,000 A | 9/1995 | Larsen |
| 5,457,927 A | 10/1995 | Pellock et al. |
| 5,461,893 A | 10/1995 | Tyler |
| 5,609,236 A | 3/1997 | Neukam |
| 5,617,622 A | 4/1997 | Anderson |
| 5,618,064 A | 4/1997 | Main |
| 5,647,406 A | 7/1997 | Pucher |
| 5,657,606 A | 8/1997 | Ressel et al. |
| 5,676,358 A | 10/1997 | Shamblin et al. |
| 5,715,642 A | 2/1998 | Buers |
| 5,743,375 A | 4/1998 | Shyr et al. |
| 5,754,738 A | 5/1998 | Saucedo et al. |
| 5,782,047 A | 7/1998 | de Quesada |
| 5,850,686 A | 12/1998 | Mertes |
| 5,857,306 A | 1/1999 | Pellock |
| 5,862,912 A | 1/1999 | Schelhorn |
| 5,875,603 A | 3/1999 | Rudd |
| 5,875,604 A | 3/1999 | Rudd |
| 5,875,605 A | 3/1999 | Rudd |
| 5,881,529 A | 3/1999 | Rudd |
| 5,893,208 A | 4/1999 | Sasaki et al. |
| 5,921,054 A | 7/1999 | Rudd |
| 5,943,768 A | 8/1999 | Ray |
| 5,950,373 A | 9/1999 | von Hoff et al. |
| 5,950,374 A | 9/1999 | Gromat |
| 5,970,672 A | 10/1999 | Robinson |
| 5,970,678 A | 10/1999 | Pellock et al. |
| 5,983,589 A | 11/1999 | Daudet |
| 6,000,192 A | 12/1999 | Cohen et al. |
| 6,003,280 A | 12/1999 | Wells |
| RE36,541 E | 2/2000 | Rossi |
| 6,050,045 A | 4/2000 | Campbell |
| 6,061,887 A | 5/2000 | Kawasaki et al. |
| 6,134,859 A | 10/2000 | Rudd |
| 6,134,860 A | 10/2000 | Pagano et al. |
| 6,145,180 A | 11/2000 | Kogai et al. |
| 6,185,476 B1 | 2/2001 | Sakai |
| 6,230,872 B1 | 5/2001 | Huang et al. |
| 6,237,288 B1 | 5/2001 | Jenkins et al. |
| 6,253,504 B1 | 7/2001 | Cohen et al. |
| 6,253,521 B1 | 7/2001 | Gavin et al. |
| 6,254,306 B1 | 7/2001 | Williams |
| 6,260,327 B1 | 7/2001 | Pellock |
| 6,264,422 B1 | 7/2001 | Hennes et al. |
| 6,298,617 B1 | 10/2001 | De Quesada |
| 6,318,044 B1 | 11/2001 | Campbell |
| 6,332,304 B1 | 12/2001 | Fuhrman |
| 6,357,101 B1 | 3/2002 | Sarh et al. |
| 6,389,772 B2 | 5/2002 | Gleckman et al. |
| 6,393,794 B1 | 5/2002 | Pellock |
| 6,418,695 B1 | 7/2002 | Daudet et al. |
| 6,427,416 B1 | 8/2002 | Rassel |
| 6,430,881 B1 | 8/2002 | Daudet et al. |
| 6,430,887 B1 | 8/2002 | Daudet |
| 6,460,297 B1 | 10/2002 | Bonds et al. |
| 6,463,705 B1 | 10/2002 | Davis et al. |
| 6,505,733 B2 | 1/2003 | Troupos et al. |
| 6,513,298 B2 | 2/2003 | Rassel |
| 6,523,322 B1 | 2/2003 | Michalski et al. |
| 6,534,077 B2 | 3/2003 | Policello et al. |
| 6,550,213 B1 | 4/2003 | Butler |
| 6,557,254 B1 | 5/2003 | Johnson |
| 6,591,488 B1 | 7/2003 | Tachibana |
| 6,679,008 B2 | 1/2004 | Santa Cruz et al. |
| 6,681,140 B1 * | 1/2004 | Heil ............................ 700/95 |
| 6,739,031 B2 | 5/2004 | Shimizu |
| 6,707,219 B2 | 9/2004 | Vander Wal et al. |
| 6,813,749 B2 | 11/2004 | Rassaian |
| 6,813,919 B1 | 11/2004 | Ellis |
| 6,865,800 B2 | 3/2005 | Utecht et al. |
| 6,874,287 B2 | 4/2005 | Felser |
| 6,953,207 B2 | 10/2005 | Raming |
| 7,016,749 B2 | 3/2006 | Kuzumaki et al. |
| 7,073,303 B2 | 7/2006 | Baker |
| 7,086,209 B1 | 8/2006 | Pruitt et al. |
| 7,110,848 B2 | 9/2006 | Shibano |
| 7,130,775 B2 | 10/2006 | Takagaki et al. |
| 7,287,636 B2 | 10/2007 | Itoh et al. |
| 7,318,299 B2 | 1/2008 | Chambers |
| 7,467,469 B2 | 12/2008 | Wall |
| 2002/0108320 A1 | 8/2002 | Weiss |
| 2002/0114884 A1 | 8/2002 | Friedersdorf et al. |
| 2003/0009867 A1 | 1/2003 | Whiten et al. |
| 2003/0024174 A1 | 2/2003 | Bonds et al. |
| 2003/0115746 A1 | 6/2003 | Saito et al. |
| 2003/0155318 A1 | 8/2003 | Jacobs et al. |
| 2003/0188494 A1 | 10/2003 | Santa Cruz et al. |
| 2003/0230038 A1 | 12/2003 | Seavy |
| 2004/0073410 A1 | 4/2004 | Maly et al. |
| 2004/0093731 A1 | 5/2004 | Sarh |
| 2004/0103601 A1 | 6/2004 | Bergqvist |
| 2004/0118069 A1 | 6/2004 | Budge |
| 2004/0131463 A1 | 7/2004 | Schoenbeck |
| 2004/0145614 A1 | 7/2004 | Takagaki et al. |
| 2004/0182023 A1 | 9/2004 | Chambers |
| 2004/0237439 A1 | 12/2004 | Powell |
| 2004/0258513 A1 | 12/2004 | Cooke |
| 2005/0038541 A1 * | 2/2005 | Clark et al. ................. 700/105 |
| 2005/0055955 A1 | 3/2005 | McAdoo et al. |
| 2005/0066609 A1 | 3/2005 | Olah |
| 2005/0108957 A1 | 5/2005 | Quesada |
| 2005/0186062 A1 | 8/2005 | Wall |
| 2005/0210761 A1 | 9/2005 | Mower et al. |
| 2005/0210762 A1 | 9/2005 | Broberg |
| 2006/0059808 A1 | 3/2006 | Nguyen |
| 2006/0075718 A1 | 4/2006 | Borne et al. |
| 2006/0117689 A1 | 6/2006 | Onken et al. |
| 2006/0191232 A1 | 8/2006 | Salazar et al. |
| 2006/0218870 A1 | 10/2006 | Messenger et al. |
| 2006/0242823 A1 | 11/2006 | Kilibarda |
| 2006/0260264 A1 | 11/2006 | Reynolds |
| 2007/0144077 A1 | 6/2007 | Quaranta et al. |
| 2007/0174027 A1 | 7/2007 | Moiseyev |
| 2007/0237923 A1 | 10/2007 | Dorsy |
| 2008/0120198 A1 | 5/2008 | Seaman et al. |
| 2008/0210139 A1 | 9/2008 | Watanabe et al. |
| 2008/0300713 A1 | 12/2008 | Leith |

| | | | |
|---|---|---|---|
| 2009/0223144 A1 | 9/2009 | Leahy | |

FOREIGN PATENT DOCUMENTS

| | | |
|---|---|---|
| EP | 1205266 A | 5/2002 |
| GB | 2075083 A1 | 11/1981 |
| GB | 2406180 | 3/2005 |
| JP | 52056465 A | 5/1977 |
| JP | 1180002 | 7/1989 |
| JP | 06325134 A | 11/1994 |
| JP | 7-292767 | 7/1995 |
| JP | 8218633 | 8/1996 |
| JP | 09277126 A | 10/1997 |
| JP | 11129131 A | 5/1999 |
| JP | 2000-057198 | 2/2000 |
| JP | 2003-003489 | 1/2003 |
| JP | 2003-181842 | 7/2003 |
| JP | 2004-038810 | 2/2004 |
| JP | 2004-110658 A | 4/2004 |
| JP | 2004-232448 A | 8/2004 |
| KR | 2004-019437 A | 3/2004 |
| KR | 2004-091838 A | 11/2004 |
| WO | 9606985 | 3/1996 |

* cited by examiner

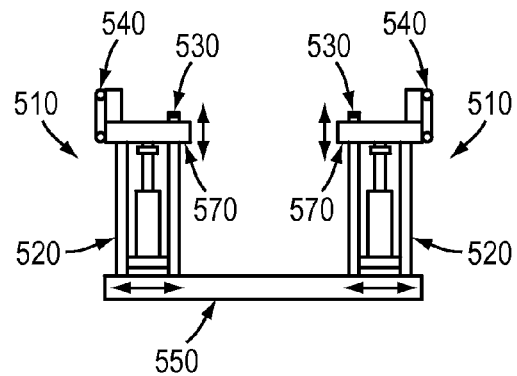
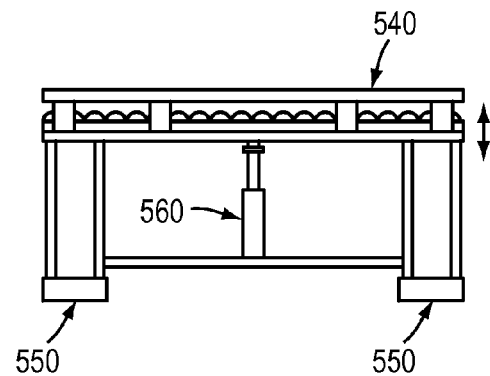
FIG. 5A  FIG. 5B
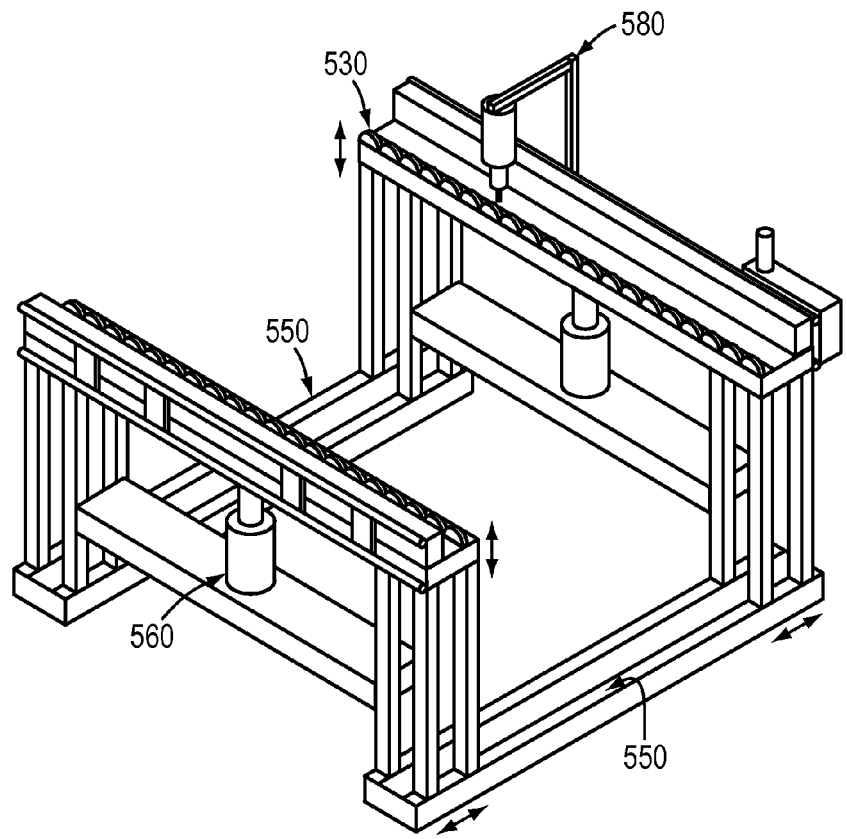
FIG. 5C

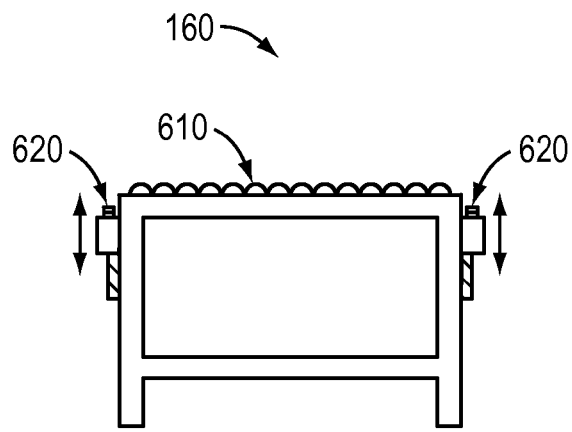
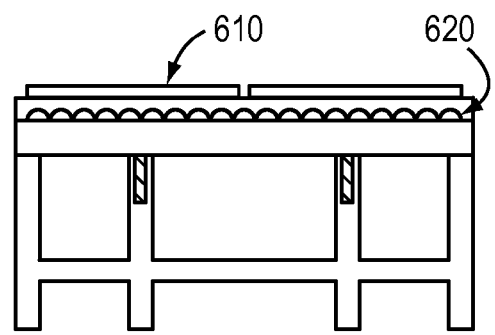
FIG. 6A  FIG. 6B
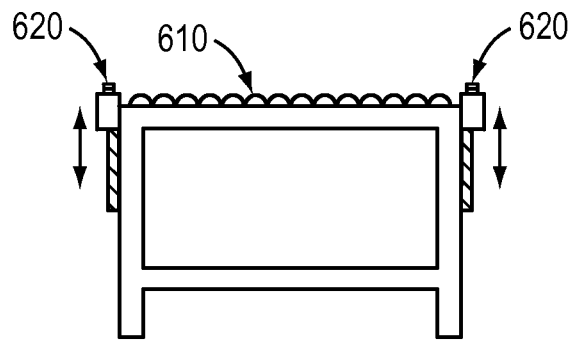
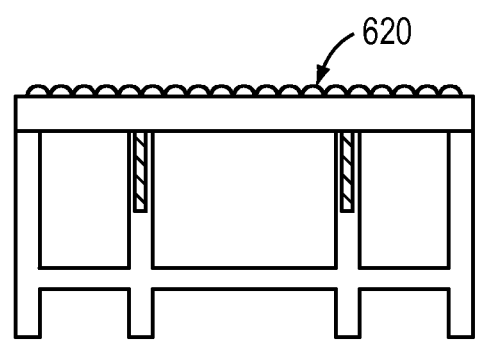
FIG. 6C  FIG. 6D

| STUDS | | | | |
|---|---|---|---|---|
| NO. | DESCRIPTION | L (mm) | QTY | KNOCKOUTS |
| S201 | 362S 125-33 | 22.6875 | 1 | 18 |
| S211 | 362S 162-33 | 124.8125 | 2 | 26.625, 56.625, 104.625 |
| S212 | 362S 162-43 | 124.8125 | 10 | 26.625, 56.625, 104.625 |
| S212-A | 362S 162-43 | 107.875 | 2 | 18, 48, 96 |
| S412 | 800S 162-43 | 53.625 | 2 | |
| TRACKS | | | | |
| NO. | DESCRIPTION | L (mm) | QTY | KNOCKOUTS |
| T101 | 250T 125-33 | 124.8125 | 1 | |
| T201 | 362T 125-33 | 56.9375 | 1 | |
| T201-A | 362T 125-33 | 40.1875 | 1 | |
| T201-B | 362T 125-33 | 38.875 | 2 | |
| T203 | 362T 125-54 | 154.0 | 2 | |
| T203-A | 362T 125-54 | 56.9375 | 1 | |
| MISCELLANEOUS PARTS | | | | |
| NO. | DESCRIPTION | L (mm) | QTY | KNOCKOUTS |
| BR | 150U50-43 | 77.25 | 1 | |
| BR-A | 150U50-43 | 43.75 | 1 | |
| FS22 | FSC 2.5 x 0.043 | 144.1875 | 4 | |
| UA | UPLIFT ANCHOR | | 4 | |
| PANEL STATISTICS | | | | |
| | | WT (kg) | WT (lbs) | |
| STEEL WEIGHT | | 117.11 | 258.23 | |
| | | AREA (sq m) | AREA (sq ft) | |
| STEEL WEIGHT | | 117.11 | 258.23 | |

FIG. 13

```
|METRIC
$W102
*1
STUDS
S213        92 x 41 x 1.44   3294    9    730/1492/2711
S211        92 x 41 x 0.88   3294    3    730/1492/2711
TRACKS
T101        64 x 32 x 0.88   430     5
T101A       64 x 32 x 0.88   333     5
T202        92 x 32 x 1.15   3036    2
MISCELLANEOUS
BR          38 x 13 x 1.15   3036    2
WEIGHT
STEEL WEIGHT          90     199
PANEL AREA            10.03  107.92
$W106
*2
STUDS
S212        92 x 41 x 1.15   3021    7    457/1219/2438
S231        92 x 76 x 0.88   3021    2    457/1219/2438
S201        92 x 32 x 0.88   550     2    457
S201-A      92 x 32 x 0.88   388     4
S201-B      92 x 32 x 0.88   376     2
S412        203 x 41 x 1.15  1741    2
S412-A      203 x 41 x 1.15  1310    2
TRACKS
T202        92 x 32 x 1.15   3970    2
T202-A      92 x 32 x 1.15   1826    1
T202-B      92 x 32 x 1.15   1395    2
T201        92 x 32 x 0.88   1359    1
T201-A      92 x 32 x 0.88   547     1
MISCELLANEOUS
BR          38 x 13 x 1.15   521     2
BR-A        38 x 13 x 1.15   362     2
BR-B        38 x 13 x 1.15   166     2
WEIGHT
STEEL WEIGHT          87     193
PANEL AREA            12.03  129.44
```

FIG. 18

INFORMATION TECHNOLOGY PROCESS FOR PREFABRICATED BUILDING PANEL ASSEMBLY

CROSS-REFERENCE TO RELATED APPLICATIONS

This application claims priority to and the benefit of U.S. provisional patent application Ser. No. 60/791,982 filed Apr. 14, 2006, the disclosure of which is being incorporated herein by reference in its entirety. This application is related to U.S. application Ser. No. 11/707,650, entitled "Material Transport System for Building Panel Assembly," U.S. application Ser. No. 11/707,638, entitled "Framing Table for Building Panel Assembly," U.S. application Ser. No. 11/707,563, entitled "Bi-Directional Roller Table," U.S. application Ser. No. 11/707,649, entitled "Automatic Pinning Process for Building Panel Assembly," U.S. application Ser. No. 11/707,555, entitled "Overhead Gantry for use in Building Panel Construction," U.S. application Ser. No. 11/707,645, entitled "Tools and Methods for Designing a Structure Using Prefabricated Panels," U.S. application Ser. No. 11/707,637, entitled "Kit for Manufacturing an Enclosure from Prefabricated Panels," U.S. application Ser. No. 11/707,646, entitled "Component Manufacturing System for a Prefabricated Building Panel," and U.S. application Ser. No. 11/707,561, entitled "Manufacturing Method for a Prefabricated Building Panel," all filed of even date herewith, the disclosures of which are being incorporated herein by reference in their entirety.

FIELD OF THE INVENTION

The present invention relates generally to the field of building construction, and more particularly to methods and apparatus for the design, construction and transport of prefabricated panels for steel frame building construction.

BACKGROUND OF THE INVENTION

Conventional building construction has many problems, not the least of which is the time and expense required to construct a structure, such as a multi-story home or office building. Much construction work is custom work that is performed on-site, and so is subject to a variety of inefficiencies. New methods for construction are needed to alleviate the problems with current techniques.

One method of construction that addresses a number of the limitations of traditional building construction is the use a prefabricated panels, constructed from steel and/or other appropriate materials. These panels can be constructed offsite before being shipped to the construction site and assembled into a building. The construction and organization of these panels may, however, be complicated in itself. As a result, many of the expected advantages of the use of prefabricated panels in building construction have not been fully realized, especially with respect to the systematic management and control of construction of a building from initial design stage to final assembly.

SUMMARY OF THE INVENTION

In general, in one embodiment, the disclosed technology enables manufacturers to design and manufacture structural wall panels, floor panels and roof panels from cold-formed steel for use in residential and commercial construction. The panels are individual components that can be installed at a building site to form a structure that includes walls, floor and a roof. Structures can be manufactured in a manufacturing facility and delivered to a site for immediate construction.

One attribute of certain embodiments is that they use cold-formed steel raw materials instead of traditional wood and concrete construction methods. There are several advantages to the structures that result from the disclosed technology both to the builders and to the consumers that live or work in these structures. The advantages to the builders are stronger buildings that can withstand hurricane conditions and significant seismic forces, increased speed of construction, improved quality of construction which reduce after sales service costs, safer construction due to the use of non-combustible materials, and less on-site labor to construct these projects. The benefits to the consumers that live in these homes or work in these buildings are better energy performance, environmental benefits due to use of recycled steel, homes that last longer, and better indoor air quality, to name just a few.

In one embodiment, the manufacturing process includes use of a computer-aided design software application that is integrated with enterprise management software. The design software is used to develop the design for a building. Information from the design software is provided to enterprise software that is used to control and manage the production line and fabrication process for each of the components. The fabrication includes using steel in the form of steel coil, which is cut to length and assembled into panels that are used to construct the floor, walls, and roof of a building, which might be, for example, as tall as six stories.

One aspect of the invention may include a process for manufacturing a structure. This process includes receiving a design for a structure and creating a model of the structure comprised of panels, wherein the panels comprised of cold-formed steel, in response to the design. The process further includes generating, in response to the model, specifications for panels, bills of materials for panels, panel fabrication drawings, and panel installation drawings, managing manufacture of each of the panels in a manufacturing facility according to the bill of materials and the fabrication drawings, and collecting in the manufacturing facility the panels and other parts for delivery.

In one embodiment, the process can further include transporting the panels and other parts to a construction site, and, at the construction site, assembling the panels into a structure according to the panel installation drawings.

Another aspect of the invention can include a manufacturing system for manufacturing a steel structure. This manufacturing system can include a computer-aided design (CAD) system for creating a model of a building structure by generating specifications for panels, bills of materials for panels, panel fabrication drawings, and panel installation drawings, and a manufacturing enterprise management system for managing manufacture of each of the panels according to the specifications and the fabrication drawings.

In one embodiment, the manufacturing system can further include a material optimizer for cutting material and forming the metal into a part of a panel according to the specifications, and a material handling system including a tray, conveyor, and rails for collecting parts, including parts formed by the material optimizer, for assembly as described in the fabrication drawings. The manufacturing system can also include a pre-fastener for fastening parts into a subassembly as described in the fabrication drawings, a framing table for assembling parts and/or subassemblies into a panel as described in the fabrication drawings, and a sheathing table for applying a coating or covering to the panel as described in the fabrication drawings.

In one embodiment, the manufacturing system can further include an overhead gantry system, including a crane and a grabbing device for holding an assembled panel and collecting panels for delivery.

One aspect of the invention can include a material transport system for use in building panel assembly for metal frame building construction. The material transport system includes a rail system including at least one starting location and at least one end location, at least one tray adapted to travel along the rail system, wherein the tray is adapted to carry construction elements for assembly into a metal frame building panel, and at least one work station located on the rail system.

In one embodiment, the at least one work station can include at least one of a tray loading station, an inventory check station, a test station, a monitoring station, a pre-weld station, a sub-assembly station, an assembly station, a post-weld station, and a sheeting station. The rail system can be adapted to deliver one or more construction elements to an assembly station. The system can include at least one starting location and a plurality of end locations. The rail system can include at least one junction connecting the at least one starting location to the plurality of end locations. Each of the plurality of end locations can include an assembly station. The assembly station can include a framing table.

In one embodiment, the starting location can include a tray loading station. The rail system can include a plurality of rollers. In one embodiment, the tray can include at least one rolling element. The tray can be manually moved along the rail system. The movement of the tray along the rail system may also be gravity assisted. In another embodiment, the tray may be automatically moved along the rail system.

The material transport system can further include a return leg adapted to return a tray to the starting location. The return leg can include a track located below the rail system. Alternatively, the return leg can include a track located above the rail system. The return leg may be one of an automatic, a manual, and a gravity assisted return leg. In one embodiment, the starting position can include an elevator element adapted to move the tray from the return leg to the rail system.

One aspect of the invention can include a framing table for use in building panel assembly for metal frame building construction. The framing table can include at least two panel supports. The panel supports can include a support structure, a transport element mounted to an upper portion of the support structure and configured to enable slideable movement thereon, and at least one side bar mounted to an upper portion of the support structure. The at least one side bar may be configured to at least partially position a building panel during assembly. The framing table can further include at least one track supporting at least one of the at least two panel supports, wherein the at least one track can be configured to enable relative movement between the at least two panel supports in at least one horizontal axis, and wherein a least one element of the building panel is supported by the at least two panel supports during assembly.

In one embodiment of the invention, the framing table can further include a control system. In one embodiment, moving at least one of the at least two panel supports on the at least one track enables the construction of building panels of different dimensions. The framing table may be configured to support a building panel of up to 24 ft by 24 ft.

In one embodiment, each of the at least two panel supports may be supported by at least one track. The at least two panel supports may be supported by the same at least one track. Alternatively, the at least two panel supports may be supported by different tracks. The at least one side bar may be configured to provide a compression force on the building panel during assembly.

In one embodiment, the framing table can further include at least one hydraulic lift. The at least one hydraulic lift may be configured to enable vertical movement of at least one of the at least two panel supports. The at least one hydraulic lift may be configured to enable simultaneous vertical movement of the at least two panel supports.

In one embodiment, the framing table can further include at least one screw gun coupled thereto. The at least one screw gun may be manually operated. Alternatively, the at least one screw gun may be automatically operated in response to a signal from the control system. In one embodiment, the transport element comprises a plurality of rollers. The transport element on the at least two panel supports may be configured to enable an assembled panel to be slideably removed from the framing table.

Another aspect of the invention can include an apparatus for the bi-directional transport of construction materials for use in a material transport system. This bi-directional transport apparatus can include a table, a first roller set mounted to the table and configured to support the construction materials on the table, and a second roller set mounted to the table, wherein the second roller set is movable between a first position below a plane defined by the first roller set and a second position above the plane defined by the first roller set. The bi-directional transport apparatus can further include a moving element for moving the second roller set between the first position and the second position, wherein raising the second roller set to the second position allows the second roller set to support the construction materials on the table.

In one embodiment, the first roller set may be configured to support the construction materials in a first direction of travel, and the second roller set may be configured to support the construction materials in a second direction of travel. The first direction of travel may be substantially perpendicular to the second direction of travel.

A plane defined by at least one of the first roller set and the second roller set may substantially horizontal. Alternatively, a plane defined by at least one of the first roller set and the second roller set is at a small angle to the horizontal. For example, a plane defined by at least one of the first roller set and the second roller set may be set at an angle of less than 20° to a horizontal plane, or more particularly less than 10° to a horizontal plane.

The first roller set can include at least one row of parallel rollers. The second roller set can also include at least one row of parallel rollers. The moving element can include a manual mechanism. Alternatively, the moving element can include a powered mechanism. At least one of the first roller set and the second roller set can include a powered element. This powered element may be controlled by a control system.

Another aspect of the invention can include a system for the bi-directional transport of construction materials for use in a material transport system. This system can include a plurality of transport elements, wherein each of the plurality of transport elements includes a table, a first roller set mounted to the table and configured to support the construction materials on the table, a second roller set mounted to the table, wherein the second roller set is movable between a first position below a plane defined by the first roller set and a second position above the plane defined by the first roller set, and a moving element for moving the second roller set between the first position and the second position, wherein raising the second roller set to the second position allows the second roller set to support the construction materials on the table.

In one embodiment, the plurality of transport elements are arranged in a grid, such as a rectangular or square grid. For example, the plurality of transport elements may be arranged with between one and three transport elements in one axis of the grid and between one and ten transport elements in another axis of the grid, resulting in a grid of up to thirty transport elements. In one embodiment, the transport elements may have a surface area of up to 24 ft by 24 ft. In an alternative embodiment, the transport elements may have a smaller or larger surface area, as required. The upper surface of the transport element may be set at any appropriate height above the ground.

In one embodiment, the system can further include a space between each neighboring transport element. The space may be sized to enable passage of a person between the plurality of transport elements. This can allow a user to move between tables in the system to gain easy access to any portion of the construction material being transported. The plurality of transport elements can be configured to support the construction materials as they are moved between tables. The construction materials may include completed or partially completed building panels or parts thereof. Alternatively, the construction materials may include boxes of construction equipment or parts, machining equipment, or any other large element that can be moved from one area of a manufacturing facility to another.

Another aspect of the invention can include a method of pinning a metal frame building panel for use in building construction. This method can include the steps of positioning components of a building panel in a predetermined arrangement for pinning, holding the positioned components in position for pinning, locating pin holes in the positioned components, positioning an automated pinning system at a set starting position with respect to the located pin holes, and inserting pins into the located pin holes using the automated pinning system, thereby pinning the components together to form a metal frame building panel.

In one embodiment, the locating step can include drilling pin holes in the positioned components using a drill system. The drill system can include a manually positionable drill. Alternatively, or in addition, the drill system can include an automatically positionable drill. The drill system may be adapted to automatically create pin holes according to a predetermined pattern.

In one embodiment, the locating step can include aligning pre-drilled holes in the components. The automated pinning system may be adapted to insert pins according to a predetermined pattern corresponding with the locations of the pin holes in the positioned components. The predetermined pattern may be stored by a control system controlling the automated pinning system. The predetermined pattern may be associated with a panel identifier attached to one or more component of the panel. This panel identifier may include panel information, panel material information, individual panel assembly information, structure assembly information, job number information, user information, and structure design information. The panel identifier may include a barcode that may be read by a barcode reader associated with the control system.

In one embodiment, the components may be held in position on a framing table. In one embodiment, the automated pinning system, and/or the control system, may be coupled to the framing table.

Another aspect of the invention can include an apparatus for transporting a panel for use in metal frame building construction. This apparatus may include a first track, a support member movably coupled to the first track, at least two support arms coupled to the support member, and a lifting member coupled to a distal end of each of the at least two support arms, wherein each lifting member is configured to engage an edge of a panel, and wherein the at least two support arms are moveable with respect to each other such that the lifting members can lift and support the panel in a substantially horizontal orientation.

In one embodiment, the first track may be moveably coupled to at least one second track. A longitudinal axis of the at least one second track may be substantially perpendicular to a longitudinal axis of the first track. In one embodiment, the apparatus can include two second tracks. The two second tracks may support the first track at its distal ends.

In one embodiment, the apparatus can include two support arms. A means of moving the at least two support arms with respect to each other can include a manual mechanism. Alternatively, a means of moving the at least two support arms with respect to each other can include a powered mechanism. The apparatus can further include a control system. The control system may control the movement of the at least two support arms. The control system may further control the movement of the support member. The control system may control the movement of the first track with respect to the at least one second track.

In one embodiment, each lifting member may be configured to engage the edge of the panel from below. As a result, the panel is only supported from below, with a minimal force applied to the edges of the panel. This may limit any damage to the panel during transport. A small force may be applied to the edges of the panel by the support arms to assist in stabilizing the panel.

In one embodiment, the first track and the at least one second track may be configured to enable a panel to be transported to any point within a plane defined by a limit of travel of the support member and the first track. The at least one second track may coupled to a roof of a building. Alternatively, or in addition, the at least one second track may be supported by a plurality of pillars attached to a floor and/or wall of a building.

A further aspect of the invention can include a method for designing an enclosure using prefabricated panels. The method can include the steps of receiving a design for a structure, creating a model of the structure including prefabricated cold form steel panels in response to the design, and generating, in response to the model, structural specifications for the prefabricated panels.

In one embodiment, the method can further include the step of generating, in response to the structural specifications, a parts list for the prefabricated panels. The method can also further include the steps of manufacturing the prefabricated panels in accordance with the structural specifications and collecting the prefabricated panels and other parts for delivery. The collecting step can include organizing the panels in a specific order in accordance with the structural specifications to facilitate the ease and speed of assembly upon delivery to a construction site.

In one embodiment, the method can further include the steps of delivering the panels to a construction site and assembling the panels into a structure in accordance with the structural specifications. The prefabricated panels can be selected from a predetermined list of panel sizes and shapes. The prefabricated panels may be of any size and shape to fit the design for the structure. The structural specifications can include at least one of panel information, panel material information, individual panel assembly information, structure assembly information, job number information, user information, and structure design information. In one embodiment, the model of the structure may be created by a computer-aided design tool. The computer-aided design tool can include a database of acceptable panel configurations.

Another aspect of the invention can include a computer-aided design (CAD) tool for designing a structure using prefabricated panels. This tool can include an input function for receiving a design for a structure, a modeling function for generating a model of the structure based on the received design information, a database of cold form steel panel configurations, a panel application function adapted to fit appropriate panels to the generated model, and an output function for generating structural specifications for the required structural panels. The specifications can include specifications for manufacturing and assembling cold form steel parts into panels.

Another aspect of the invention can include a manufacturing system for manufacturing a steel structure. The manufacturing system can include a computer-aided design system for creating a model of a building structure to be manufactured using cold form steel panels and a manufacturing enterprise management system for managing manufacture of each of the panels according to the specifications and the fabrication drawings.

In one embodiment, the manufacturing enterprise system generates specifications for panels, bills of materials for panels, panel fabrication drawings, and panel installation drawings. The system can further include a material optimizer for cutting material and forming the metal into a part of a panel according to the specifications and a material handling system including a tray, conveyor, and rails for collecting parts, including parts formed by the material optimizer, for assembly as described in the fabrication drawings. The system can further include a pre-fastener for fastening parts into a sub-assembly as described in the fabrication drawings, a framing table for assembling parts and/or subassemblies into a panel as described in the fabrication drawings, and a sheathing table for applying a coating or covering to the panel as described in the fabrication drawings. In one embodiment, the system can further include an overhead gantry system including a crane and a grabbing device for holding an assembled panel and collecting panels for delivery.

One aspect of the invention can include a process for managing the assembly of a panel for use in steel frame building construction. This process may include receiving structure design information from a computer aided design tool, providing information for the selection of components for the panel from a panel library, providing assembly instructions for the panel, and tracking the location and stage of construction of the panel through a manufacturing process.

In one embodiment, at least one of the component selection information and panel assembly instructions is generated in a printable format. The process can further include providing information labels associated with at least one component of the panel. The information labels can include construction information. The construction information can include at least one of part number information, assembly information, tracking information, job number information, bar code information, panel information, geometrical information, user information, and combinations thereof.

In one embodiment, the tracking step can include entering construction information into an information technology system. The information technology system can include a plurality of user interface terminals. The plurality of user interface terminals may be associated with a plurality of workstations on an assembly line. The information technology system can provide further construction information to a user in response to the entering of construction information into a user interface terminal. The plurality of user interface terminals can include at least one of a barcode reader, a touch sensitive screen, a computer terminal, a printer, and combinations thereof.

Another aspect of the invention can include a kit for manufacturing a habitable enclosure using prefabricated panels. The kit can include a plurality of prefabricated metal panels, at least one stabilizing element to releasably hold the plurality of prefabricated panels in a predetermined manner during transportation, and assembly instructions for assembly of the plurality of panels into the habitable enclosure, wherein the plurality of prefabricated metal panels are organized in accordance with the assembly instructions during transportation in order to facilitate ease and speed of construction.

In one embodiment, the plurality of prefabricated metal panels can include a plurality of predetermined sizes and shapes. Each of the plurality of prefabricated metal panels can further include panel information attached thereon. The panel information can include at least one of assembly information, manufacturing site information, time information, user information, job number information, bar code information, safety information, geometrical information, and combinations thereof. The panel information may be marked directly onto each individual prefabricated metal panel. Alternatively, or in addition, the panel information may be marked on a label affixed to each individual prefabricated metal panel.

In one embodiment, the plurality of prefabricated metal panels may be organized according to the order of use of the panels during construction. The plurality of prefabricated metal panels may be assembled into a plurality of bundles for transportation. This allows the kit to be transported on a number of transport vehicles, and/or be transported in stages. The plurality of bundles can each include a stabilizing element. The kit can further include at least one protective element. The protective element may be configured to protect the plurality of prefabricated metal panels from damage during transportation.

In one embodiment, The kit can further include a supporting element. The supporting element may be configured to support the kit during lifting and transporting. The supporting element may be configured to enable lifting of the kit by at least one of a crane and a forklift truck.

Another aspect of the invention can include a process for manufacturing components for assembly into a metal frame panel for use in metal frame building construction. The process can include receiving panel design information for at least one component of a metal frame panel from a computer aided design tool, sending the component information for the at least one component to a metal roll handler, and manufacturing at least one component of the metal frame panel in accordance with the component information using the metal roll handler.

In one embodiment, the process can further include marking construction and assembly information onto the at least one manufactured component for use in metal frame panel assembly. The individual component information can include rolling and cutting information. The rolling and cutting information can include at least one of a length, a width, a thickness, a material, a cut angle, a bend angle, a bend location, a cut location, and combinations thereof.

In one embodiment, the metal roll handler can include a cutting tool and a bending tool. The metal roll handler can further include a metal roll holder and a feeding element for feeding an unwound portion of a metal roll into at least one of the cutting tool and bending tool. The panel design information can include information for a plurality of components of a single metal frame panel. In one embodiment, the process can further include grouping the plurality of manufactured components for panel assembly.

Another aspect of the invention can include a method of manufacturing a metal frame building panel for use in building construction. The method can include the steps of selecting components for an individual building panel and placing the components on a material transport system. The method can further include the steps of transporting the components on the material transport system to a framing table, assembling the components into an assembled panel on the framing table, and removing the assembled panel from framing table.

In one embodiment, the method can further include the steps of placing the assembled panel onto at least one bi-directional roller table, transporting the assembled panel on the at least one bi-directional roller table to at least one post-assembly work station, and performing post-assembly work on the assembled panel to complete the panel.

In one embodiment, the one or more post-assembly work station can include at least one of a welding station, a sheeting table, a painting station, an insulation insertion station, and combinations thereof. The method can further include the steps of lifting the completed panel using an overhead gantry and moving the completed panel to a storage area using the overhead gantry. The material transport system can include at least one work station.

In one embodiment, the at least one work station can include at least one of a tray loading station, an inventory check station, a test station, a monitoring station, a pre-weld station, a sub-assembly station, an assembly station, a post-weld station, and a sheeting station. The assembling step can include positioning the components in a predetermined arrangement and pinning the components together to form the assembled panel. At least one of the steps may be at least partially automated. For example, the pinning step may be at least partially automated.

BRIEF DESCRIPTION OF THE DRAWINGS

FIG. 5A is a schematic side view of a framing table, in accordance with one embodiment of the invention;

FIG. 5B is a schematic end view of the framing table of FIG. 5A;

FIG. 5C is a schematic perspective view of the framing table of FIG. 5A with an attached fastening element;

FIG. 6A is a schematic end view of a bi-directional roller table with the second roller set in a lowered configuration, in accordance with one embodiment of the invention;

FIG. 6B is a schematic side view of the bi-directional roller table of FIG. 6A with the second roller set in a lowered configuration;

FIG. 6C is a schematic end view of the bi-directional roller table of FIG. 6A with the second roller set in a raised configuration;

FIG. 6D is a schematic side view of the bi-directional roller table of FIG. 6A with the second roller set in a raised configuration;

FIG. 13 is an exemplary panel material list, in accordance with one embodiment of the invention;

FIG. 18 is exemplary data export information, in accordance with one embodiment of the invention;

DETAILED DESCRIPTION OF THE INVENTION

One embodiment of the invention can include a material transport system for use in manufacturing panels for building construction, such as in buildings constructed from steel frame or other appropriate building materials, including, but not limited to, aluminum or other metals, wood, plastics, composite materials, or combinations thereof. The material transport system can include a rail system allowing an empty tray to be loaded with appropriate materials for a specific panel. These trays can then be used to transport the panel materials to different stations on a manufacturing production line. Stations on the production line can include, but are not limited to, pre-welding, construction (at "framing tables"), post-welding, and sheeting stations. The panels can be moved between one or more of the stations on roller systems. The trays for carrying the original materials can be returned to the starting location, either automatically or manually, after delivery of the materials to the framing tables.

Figure 1:
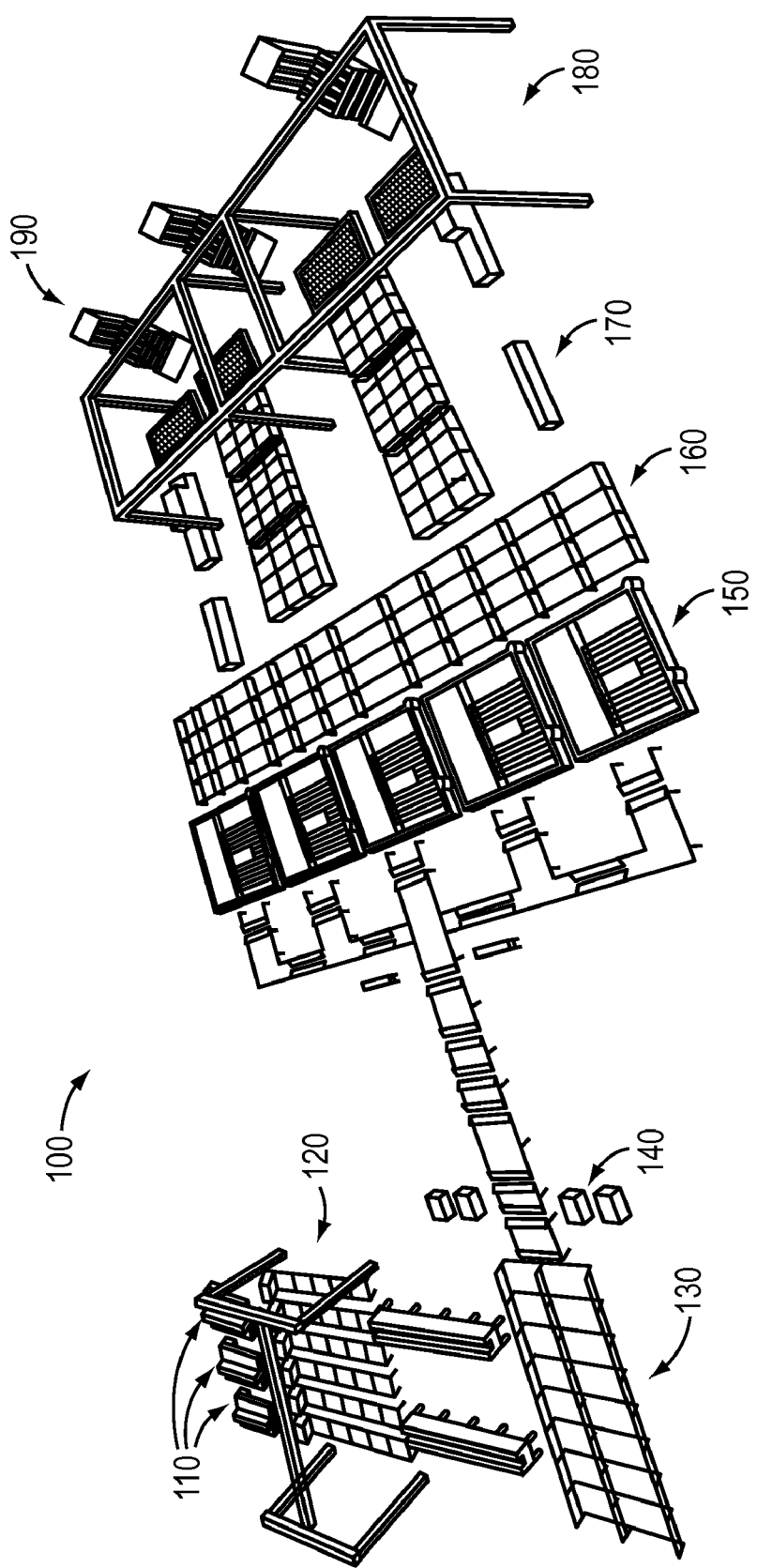
FIG. 1 is a schematic perspective view of a manufacturing facility, in accordance with one embodiment of the invention.

An example manufacturing facility 100 can be seen in FIG. 1. This manufacturing facility 100 includes a material optimizer 120 and steel coils 110 used to form and cut steel into material that can be assembled into panels. The manufacturing facility 100 further includes a material handler 130, one or more preprocessing stations 140, a number of framing tables 150, a number of bi-directional transport tables 160, one or more post-processing stations 170, an overhead gantry system 180, and a stacking system 190.

A manufacturing facility 100 can, according to one embodiment of the invention, use steel coils 110 as the raw material used to form the panels. Each panel that is fabricated may be unique in terms of size, connections, number of components, and so on. As such, the processes described herein allow for the efficient fabrication of custom designed panels, which ultimately results in the efficient fabrication of a custom-design building.

The steel coils are provided as input to a material optimizer. The material optimizer forms and cuts steel into material that can be assembled into panels. In one embodiment, the material optimizer receives data from a manufacturing management application that may include design and fabrication information for the components to be included in each individual panel being manufactured. For example, a bill of materials for each panel may include information about the components required for the panel. The material optimizer can use this information to de-coil, cut, and/or shape each flat steel panel component. For example, if a number of studs of a predetermined type are needed for a specific panel, the material optimizer 120 may manufacture those studs for assembly into the panel.

Figure 2:
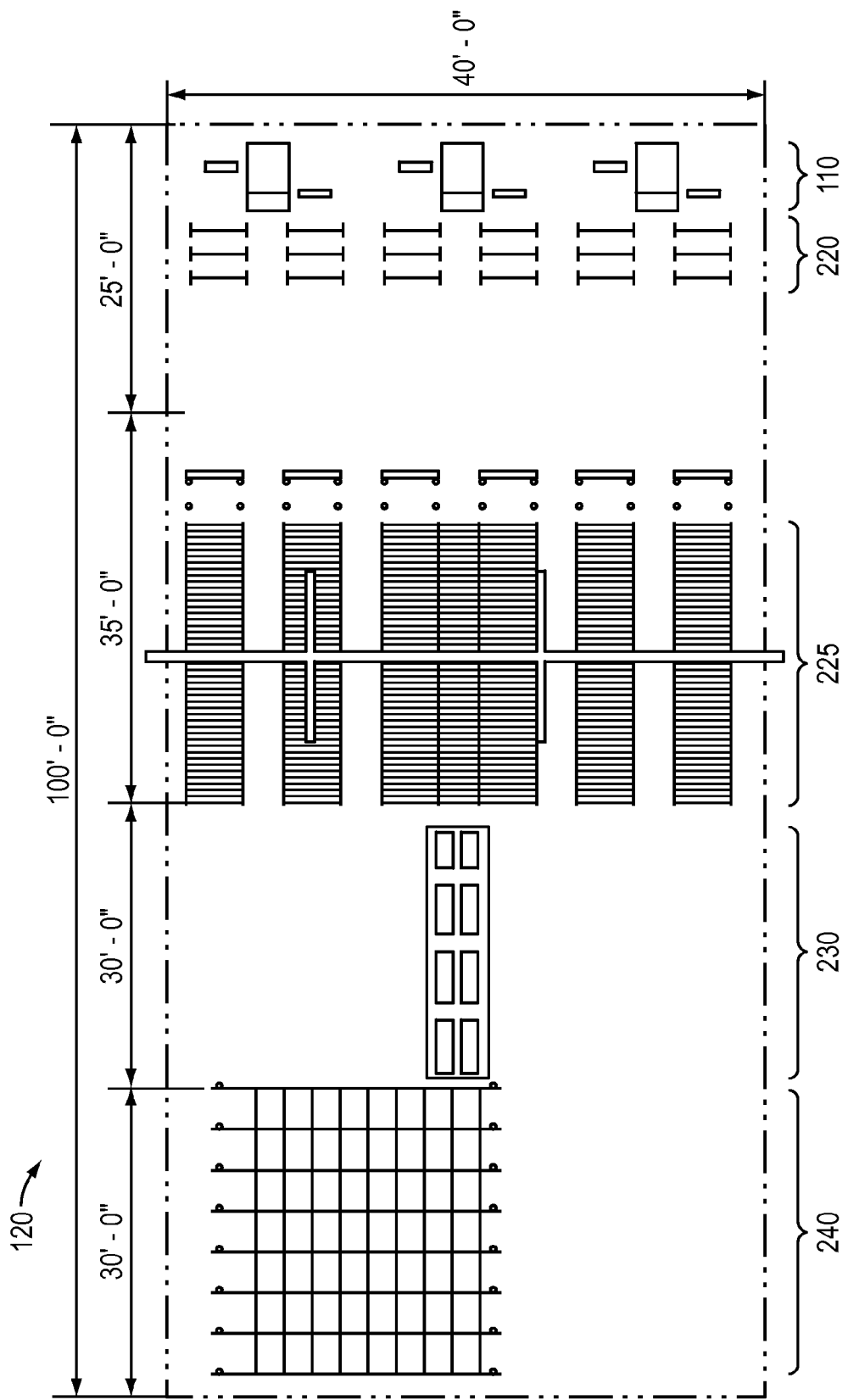
FIG. 2 is a schematic plan view of a material optimizer, in accordance with one embodiment of the invention.

An example of a material optimizer is shown in FIG. 2. In this embodiment, the material optimizer 120 starts with large steel coils 110 that can be passed through a de-coiler 220 for straightening. The straightened piece of steel is then cut to length and picked up by an overhead gantry system 225 to be fed into a roll-former 230. The steel cutter may be integrated into the roll-former 230, or be a separate component. The roll-former 230 can be adjusted, either automatically or manually, to form a piece of steel into the required shape, for example, to form a stud or a track. The roll-former 230 may include one or more roll-dies that incrementally form the steel and can create various shapes and sizes. From the roll former 230, the component may be placed on a picking area 240 for placement on a material handler for use in panel construction.

The de-coiler 220, cutter, overhead gantry system 225 and roll former 230 may, in one embodiment, be formed into an integrated system. This system can be controlled by a control system that receives data from a management system or other appropriate panel and element selection system. This allows for the controlled production of the steel components that are used to fabricate a panel. The integration of these components can provide significant benefits in this application, in that it becomes possible to efficiently manufacture individual panel components from raw materials.

In the embodiment of FIG. 2 the material optimizer 120 covers a total floor space of approximately 100 ft by 40 ft. In alternative embodiments, larger or smaller material optimizer systems may be used, depending upon the requirements of the manufacturing facility 100, with each component of the material optimizer sized accordingly. In addition, the individual components may take up more or less floor space, again as required.

In an alternative embodiment, the material optimizer can include one or more folding elements to fold the cold form steel into the required shape, such as, for example, a stud, track, I-beam, or other appropriate shape for use in panel construction. These folding elements may, in one embodiment include hydraulic powered mechanical arms or panels configured to bend a portion of a cold form steel roll at a prescribed angle. A clamping mechanism may be utilized to hold the cold formed steel roll section in place during the bending process. In an alternative embodiment, an electric motor driven, or otherwise powered bending mechanism may be utilized. In further embodiments, any appropriate combination of crimping elements, cutting elements, bending elements, and/or rolling elements may be integrated into the material optimizer to produce the necessary parts for panel construction.

Once each panel component has been cut and formed by a material optimizer, the fabrication process of building custom panels in an efficient manner can continue. In one embodiment of the invention, each component for a specific panel that is manufactured by the material optimizer is placed in a picking area, prior to loading onto a material handler. The material handler then transports the selected components to individual process and fabrication stages in an efficient, flexible manner.

Figure 3A:
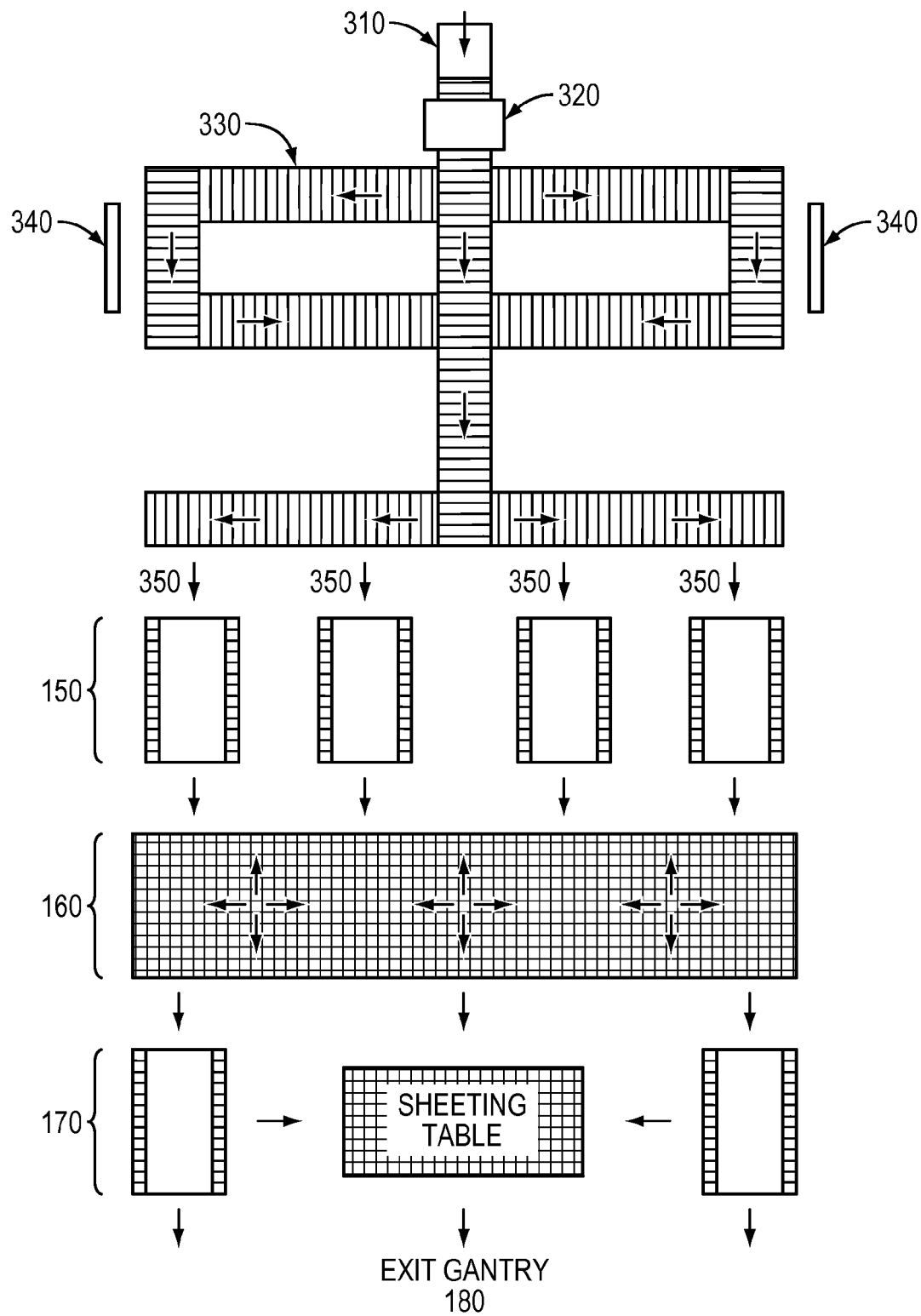
FIG. 3A is a schematic plan view of a material transport and assembly system, in accordance with one embodiment of the invention.

One embodiment of a material transport and assembly system including a material handler is shown in FIG. 3A. The material handler 130 may allow the tray to move to one or more workstations. After, or without, preprocessing at these workstations, the tray may be moved to a framing table 150 for assembly. In this embodiment, the material handler 130 can include a start elevator 310, one or more trays 320, and a conveyor and/or rail system 330 for moving these trays. The trays 310 are designed to hold long pieces of cold-formed steel components, such as those formed by a material optimizer. In one embodiment, a tray 310 is made of steel and includes roller-wheels that lock into a rail system 330 that moves the trays into certain functional areas. Other metals, plastics, woods, composites, or combinations of these materials may also be used for the trays. Due to the tray design and the roller wheels being incorporated into the system, the tray can be moved from one work station 340 to another with very little effort and with a significant level of flexibility. In particular, by allowing different patterns of movement, the conveyor enables variable movement to each work area, which allows the production line to be flexible. In an alternative embodiment, the rail system itself has rollers, or other rolling or sliding elements, incorporated therein, therefore eliminating the need for rollers on the trays.

In one embodiment, the work station 340, or work stations, can include at least one of a tray loading station, an inventory check station, a storage station, a test station, a monitoring station, a pre-weld station, a sub-assembly station, an assembly station, a post-weld station, a painting station, and a sheeting station. The material handler 130 may include any number and combination of these stations, depending upon the specific requirements of the material transport system 100. The rail system 330 can be adapted to provide tray paths allowing the tray 320 to pass through any appropriate combination of stations.

One example work station may include a stitch welder system. This stitch welder may be used to pre-weld studs, and/or other panel components, prior to final assembly. In one embodiment, the stitch welder may include a stationary welding robot specifically designed to pre-weld panel components of varying size and shape. In operation, panel components that require pre-welding may be placed directly within the welding system. Alternatively, panel components may be placed on a conveyor belt, or other transport element configured to transport panel components, which transports the panel component or components through the welding system. Once the panel components have been welded, they can be placed back on the rail system, either manually or automatically, for transport to the next work station and/or framing table. In one example embodiment, the welding system may include a spray painting unit to paint the panel components prior to being returned to the material handler.

The rail system may include any number of starting locations and any number of end locations. In the embodiment of FIG. 3A, the rail system 330 includes one start location, situated at the position of the start elevator 310, and four end locations 350, leading to the framing tables 150. As shown, the framing tables 150 then lead on to bi-directional transport tables 160, post-processing stations 170, an overhead gantry system 180, and any further elements of the material transport system 100 that may be required.

In one embodiment of the invention the tray 320 may be moved manually along the rail system 330. This movement may be gravity assisted or be gravity neutral, depending on whether the rail system 330 is flat or pitched at a slight angle. In one example embodiment of the invention, different portions of the rail system may be either flat or pitched at an angle, allowing for some parts of the rail system 330 to be gravity assisted while other parts are gravity neutral. In an alternative embodiment, a means of automatically moving the tray 320 along the rail system 330 may be employed.

Figure 3B:
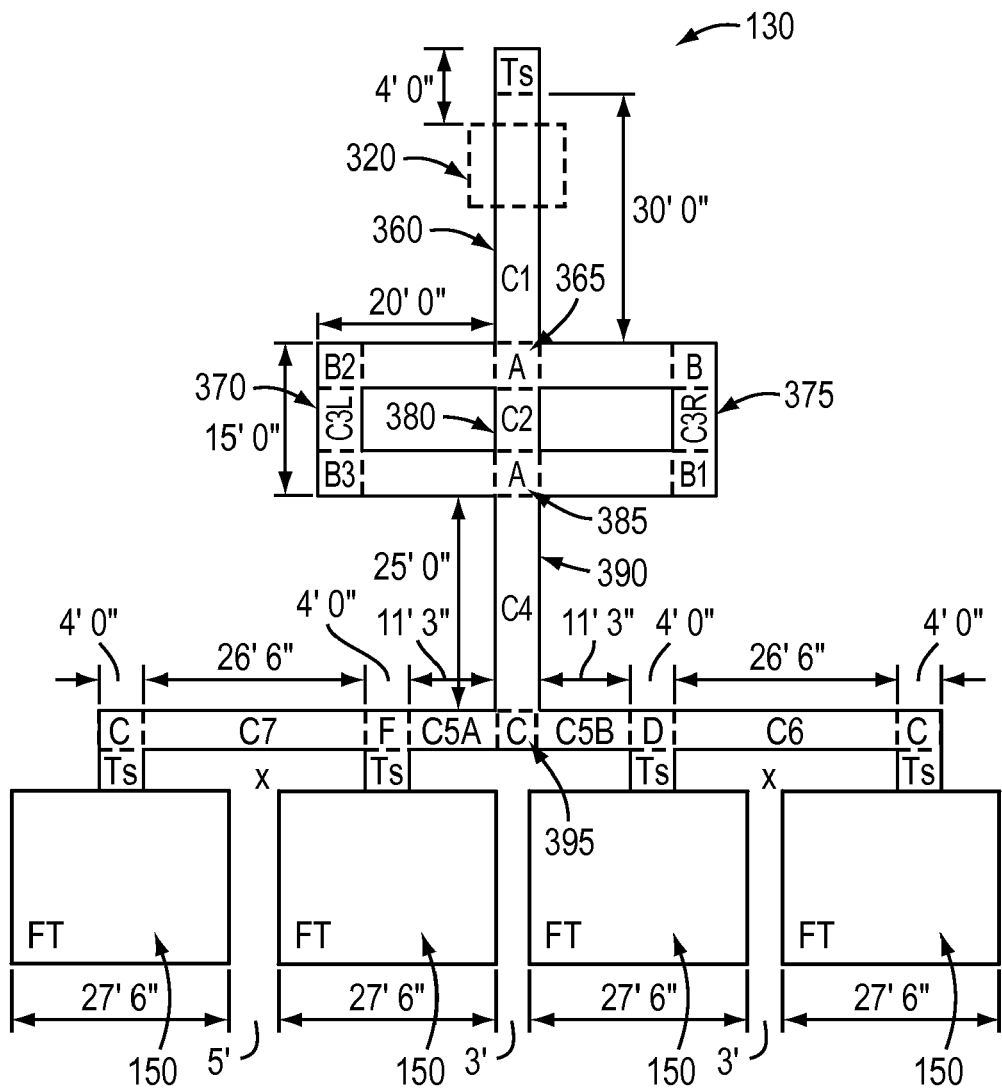
FIG. 3B is a schematic plan view of a material handler, in accordance with one embodiment of the invention.

Another example material handler, including example dimensions for each portion of the system, can be seen in FIG. 3B. In this embodiment, a tray 320 can have components that are manufactured by the material optimizer, as well as any instructions, documentation, and additional components that might be needed that are not available at the individual workstations. The tray can travel on the conveyor section 360 to the junction 365. At junction 365, the tray may go in either direction, so as to be placed at pre-processing work stations 370 or 375, or go straight through conveyor section 380 towards junction 385.

At work station 370, for example, there may be a robotic welder, described further below. At work station 375 there may be another robotic pre-welder, or another pre-processing workstation. After stopping at the pre-processing workstations for pre-assembly processing, or after passing by such processing, the tray 320 may travel down conveyor section 390 to junction 395, at which point the tray can be directed to any one of the framing tables 150.

In such a custom manufacturing environment, there is no pre-determined length of time for any particular function or step within the manufacturing process. Often, each panel is unique, making the amount of time required for each function, or at each work station, variable. The conveyor system enables this variability because trays can be moved in all directions into an open work cell without lifting.

Different work stations may have different functions and equipment associated therewith, depending upon the requirements for each panel being manufactured. In one example embodiment, a workstation may include a pre-fastening station. Pre-fastening, such as welding, can be used, for example, to form a sub-assembly required for a panel. A pre-welder may be a robotic based welder that welds galvanized cold-formed steel components together to create sub components to be used in the panel fabrication process. The pre-welder may weld galvanized steel in an automated manner, and have the capability to weld different components at unique weld points.

In one embodiment, a pre-welder may have a robotic welding arm. Information from a manufacturing management system may be provided to the robotic welder so that it knows what operations to perform. For example, a bar code associated with the components may be scanned, and the robotic welder may receive information based on the bar code, that provides the specific weld point information and the type of welding required for that subcomponent. This may be, for example, information about the welding that is generated by the design system and exported to the management system for access by the welder. The information may be provided in response to a request that includes the bar code. The steel is then provided to the welder, and the robotic arm may weld the metal components together. The welded components can then be placed back on the tray. Alternatively, the pre-fastening may be carried out on the tray itself.

In one specific implementation, the welding station can include a feeder element for feeding components through the pre-fastening workstation and a robotic arm. The robotic arm can include a weld tip that enables it to weld cold-formed galvanized steel, as well as a galvanized spray painter. The robotic welding arm has a presetting control system that identifies where the weld is specified to be and is flexible so that it can weld according to any specification. The robotic arm has this flexibility and may weld at different locations for each piece of steel that enters into the arm.

In one embodiment, a tray 320 can be moved from the start of the material handler 130 through the one or more fabrication work stations 340 to the end of the material handler 130, and then return back to the beginning of the process without the need to lift any of the trays 320. Once all the components on the trays 320 have been through the one or more work stations 340 specified for that component, the tray 320 may then be sent back to the beginning of the process either manually or automatically, after which steel components for the next panel can be placed on the tray. In one implementation, the conveyor enables the tray 320 to lower at the end of the process and travel underneath the conveyor to the beginning of the fabrication process on a return leg.

In one embodiment, the material handler 130 can also include a return leg adapted to return a tray to the starting location upon transport of the panel materials to the one or more framing tables. The return leg can include a track located either below or above the rail system. This return leg may be automatic, manual, and/or gravity assisted, as required. The return leg track may return the tray 320 to a start elevator 310, which can place the tray 320 back onto the start of the rail system 330 for reuse.

Figure 4A:
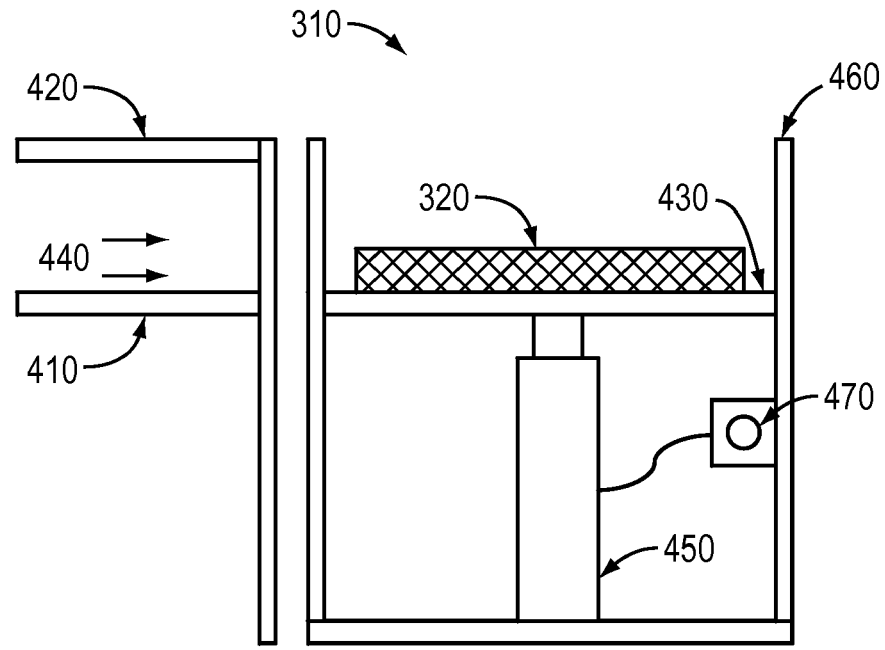
FIG. 4A is a schematic side view of a start elevator for a material handler in a lowered configuration, in accordance with one embodiment of the invention.
Figure 4B:
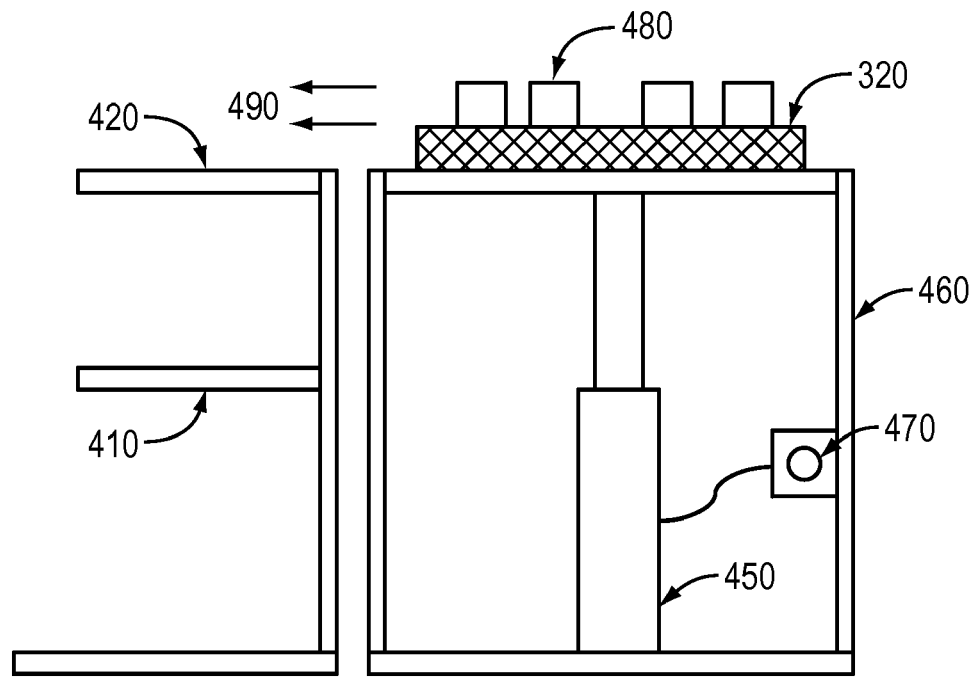
FIG. 4B is a schematic side view of the start elevator of FIG. 4A in a raised configuration.

An example of a start elevator 310 can be seen in FIGS. 4A and 4B. The start elevator 310 can be lowered to a lower level to receive empty trays from a return leg 410 of the material handler 130, and then be raised to the upper level rail system 420 to allow the tray 320 to be loaded and sent down the production line.

The start elevator 310 positioned at the lower level is shown in FIG. 4A. A tray holder 430 is positioned level with the return leg 410 such that the tray 320 may slide off of the return leg 410 and onto the tray holder 430 in the direction shown 440. As discussed above, this movement of the tray may be manual, gravity assisted, or automatic. The tray holder 430 is supported by a hydraulic jack 450 and a frame 460. The hydraulic jack 450 is controlled by a control element 470, which may in turn be controlled by a material handler control system that oversees multiple functions of the process. Alternatively, the control element 470 may be a button or other appropriate user interface element allowing raising or lowering of the tray holder 430 upon actuation by a user.

Once a tray 320 has been placed on the tray holder 430, the hydraulic jack 450 can be activated to lift the tray holder 430 up to the level of the rail system 420, as shown in FIG. 4B. The tray 320 can then be loaded with components for the next panel 480 before being directed down the rail system 420 towards the required workstations in the direction shown 490.

In alternative embodiments, other lifting and lowering equipment may be used, including, but not limited to, a pulley system, a winching system, a scissor lift system, a crane-type system, a screw system, or other appropriate lifting apparatus. This lifting apparatus may be electrically and/or hydraulically powered, or may be manually operated.

Once the components have been pre-processed and/or moved to the end of the material handler 130, they can be placed on a framing table 150 for assembly. Framing tables 150 are designed to enable the efficient fabrication of a panel. For example, in one embodiment, each framing table 150 enables a fabricator to efficiently lay out a panel and all of its components, fabricate it, fasten it, weld it and build it with minimal labor.

The framing table can also be integrated with enterprise management software, so that every panel that arrives at the table has a unique identifier, such as a barcode, with specific assembly instructions coded into the identifier. Based on this identification information, the panel may be identified by equipment at the table to determine layouts, fastening patterns, number of components and fabrication time required for this panel, as well as other specific elements for the panel.

The framing table has many elements that assist with fabrication. Examples of these elements include the ability to fasten panels from the top and bottom, compression capability, robotic movement of fastening tools, and automated marking and layout information.

Compression capability may include one or more compression elements configured to provide a compressive force to at least a portion of the panel components, and/or assembled panel, to assist in the assembly and fixing of the assembled panel. For example, a compressive force may be applied to portions of the assembled panel to ensure a close fit of the components prior to and/or during pinning, welding, gluing, or fixation of the panel through other appropriate means. The framing table may include separate compression elements, such as, but not limited to, hydraulic elements, motorized elements, air compression elements or manually operated mechanical elements configured to provide a compressive force. Alternatively, the framing table may provide a compressive force itself through the movement of one or more of the panel supports within the tracks. For example, once the panel components have been correctly positioned for assembly, the tracks may be used to move the panel supports slightly closer together such that the side bars on the panel supports compress the panel components into a tight fitting arrangement ready for fixation.

An example framing table 150, in accordance with one embodiment of the invention, can be seen in FIGS. 5A-5E. The framing table 150 includes two panel supports 510. These panel supports 510 include a support structure 520, a transport element 530 mounted to an upper portion of each support structure 520 and configured to enable slideable movement thereon, and a side bar 540 mounted to an upper portion of the support structure 520. The side bars 540 are configured to hold the building panel in position during assembly. The panel supports 510 are mounted on a pair of tracks 550 to enable relative movement between the two panel supports 510, thus allowing the framing table to be configured to hold panels of differing dimensions.

In other embodiments, only one of the panel supports 510 need be mounted on a track, such that it can move relative to a stationary second panel support 510. In still other embodiments, a greater number of panel supports 510, and or side bars 540 may be used to releasably hold the panel in place during assembly.

The framing table 150 can also include a control system, allowing for the automated control of the panel supports 510 to support and hold the specific panel being constructed. This control system may operate in response to an identifier associated with one or more of the panel components (e.g. a bar code, and RFID tag, and so forth), resulting in the framing table 150 being configured for the panel being constructed from the components associated with the identifier. For example, the panel control system may respond to information such as, but not limited to, a bar code scan, an RFID signal, a request inputted by a user, a selection from a menu of stored information, or other information about the panel, and configure the framing table 150 in response.

In one embodiment, the framing table 150 is configured to support a building panel as large as 24 ft by 24 ft, and as small as 3 ft by 3 ft. In alternative embodiments, the framing table 150 is configured to support ranges of building panel dimensions of any appropriate size and shape.

The panel supports 510 can be supported by the same track 550 or by different tracks. The side bars 540 are configured to provide a compression force on the building panel during assembly. This compressive force may be applied, for example, by moving the panel supports 510 slightly closer together on the tracks 550 after the components of the panel have been correctly positioned. This movement may be carried out automatically in response to an input to the control system, or be carried out manually.

The framing table 150 can include at least one hydraulic lift 560, configured to enable vertical movement of an upper section 570 of at least one of the panel supports 510. The hydraulic lift 560 can be configured to enable simultaneous vertical movement of the upper sections 570 of the panel supports 510, or be configured to work independently. By allowing the upper sections 570 of the panel supports 510 to be lifted and lowered, access to the panel from below and/or above can be easily facilitated, allowing for easy access to all portions of the panel during assembly.

The framing table 150 can include at least one fastening element 580, such as a screw gun. The screw gun, or guns, may be manually operated or automatically operated in response to a signal from the control system. The fastening element 580 can be releasably mounted to the framing table 150, be permanently mounted to the framing table 150, or be uncoupled from the framing table 150. In one embodiment, the screw gun can be attached to a robotic arm coupled to a panel support 510, allowing for the automatic insertion of screws or other fixing elements, such as, but not limited to rivets, nails, and clamps, in response to a control signal from the control system.

In an alternative embodiment, the framing table 150 may include two or more fastening dollies that have screw guns incorporated in both the top and bottom of the dollies. These dollies can be configured to move along the vertical side of the panel. The dollies can have button controls which enable them to fasten components of the panel, such as, but not limited to, top and bottom steel studs and/or steel tracks. The dollies can be moved easily by the operator to any location that requires fastening to occur. Alternatively, the dollies may be automatically moved in response to a control input from the control system.

The dollies may also contain a welding unit. For example, an overhead welding arm can be used allow welding of components, if required for structural strength or other reasons. In one embodiment, the weld dollies can by positioned on a support structure attached to, or separate from, the framing table, allowing for movement of the welding unit in one or more axis around the table, thus allowing welding of any portion of the assembled panel.

In one embodiment, the table provides markings with a laser or lighting system for placement of parts for fastening. Dollies can then sense these marking locations and used them to weld components, and/or insert fastening elements, where specified by a control and management system.

In use, a metal frame building panel can be constructed by first positioning components of a building panel in a predetermined arrangement on the framing table 150. Once the framing table has been engaged to hold the positioned components in position, the components can be pinned together, or otherwise connected. This can be done, in one embodiment of the invention, by locating and aligning predrilled pin holes in the positioned components, positioning an automated pinning system at a set starting position with respect to the located pin holes, and inserting pins and/or screws into the located pin holes using the automated pinning system, thereby pinning the components together to form a metal frame building panel. In an alternative embodiment, self-tapping screws may be used instead of, or in addition to, the pins inserted into predrilled holes. Using self-tapping screws alleviates the need to have aligned pin holes in the panel components prior to fixing.

In one embodiment, male and female tabs, or other appropriate mating elements, may be incorporated into some or all of the panel components to ensure that they are correctly positioned and aligned upon placement on the framing table 150. The addition of male/female mating elements on components of the panel may be advantageous, for example, when an automatic alignment mechanism is incorporated into the framing table to align the components prior to fixation of the panel.

In one embodiment, one or more functions of the framing table and associated methods may be automated. For example, an automatic alignment mechanism may be incorporated into the framing table 150 to accurately align at least a portion of the panel components within the framing table 150 after they have been placed in position. One example embodiment of the framing table 150 may include a fully automated fastening system. With this fully automated system, as soon as the panel has been assembled ready for fastening an operator can simply initiate a fastening program associated with a framing table control system, for example by pushing an appropriate button on the control system. Upon initiation, the control system can control an automated pinning, welding, gluing, and/or screwing system, to automatically fasten the panel.

The pin holes may first be drilled in the positioned components using a drill system at the framing table 150, or be drilled at a pre-processing work station prior to setting the components in the framing table 150.

The drill system can include a manually positionable drill or an automatically positionable drill. The drill system may be adapted to automatically create pin holes according to a predetermined pattern. This predetermined pattern may be stored by a control system controlling the automated pinning system. The automated pinning system and/or drilling system may be coupled to the framing table 150 or be separate from the framing table 150.

Figure 5D:
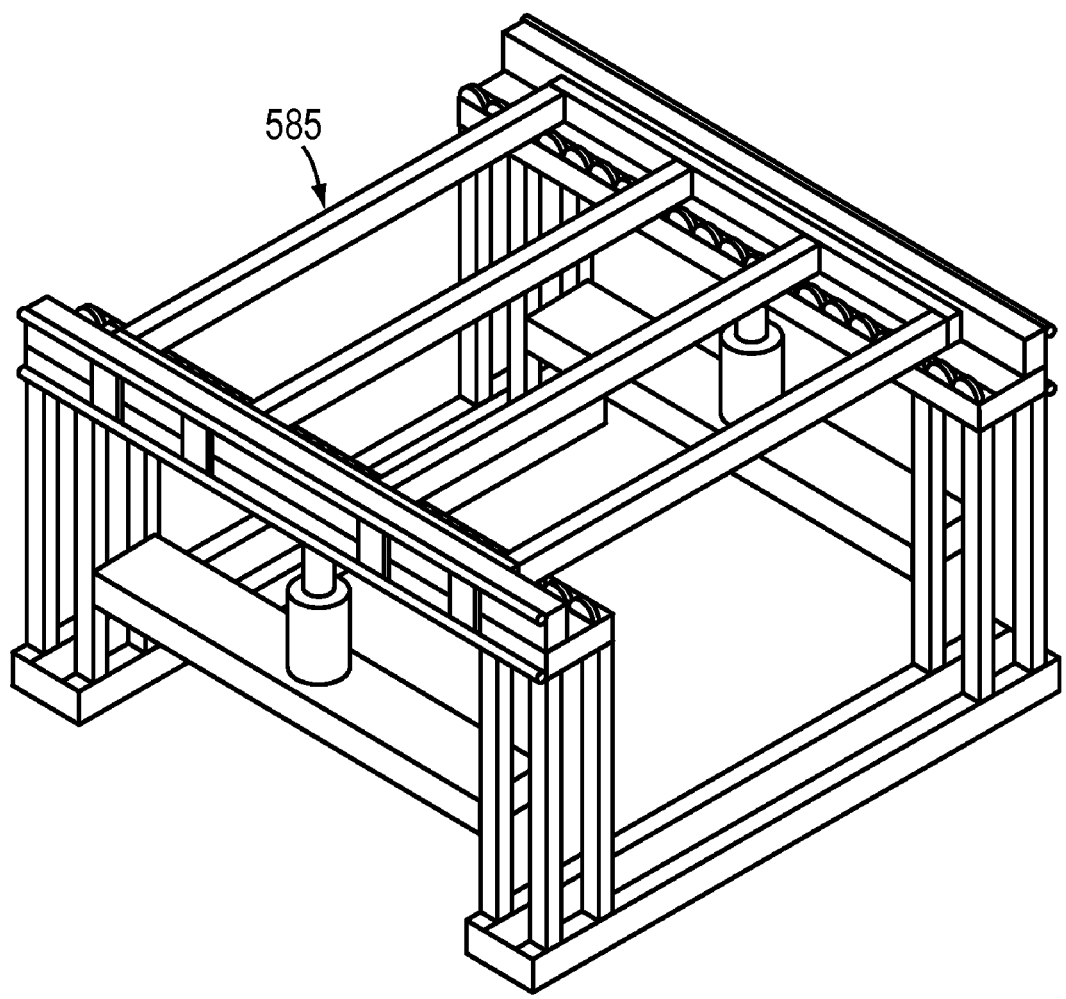
FIG. 5D is a schematic perspective view of the framing table of FIG. 5A supporting a panel.

In one embodiment, the transport element 530 can include a plurality of rollers, allowing the panel to be easily slid off of the framing table 150 after assembly. These rollers may, in one embodiment, be powered to allow the constructed panel to be automatically rolled from the framing table 150 upon a signal from the control system. Alternatively, the rollers may be free moving, allowing the panel to simply be pushed from the framing table 150 by a user. In an alternative embodiment, the rollers may be raised or lowered within the upper section 570 of the framing table 150 allowing the panel components to rest on a solid, non-rolling, surface during construction, but allowing the constructed panel to be rolled from the framing table 150 after construction is complete by raising the rollers. A constructed panel 585 positioned on a framing table 150 is shown in FIG. 5D.

Figure 5E:
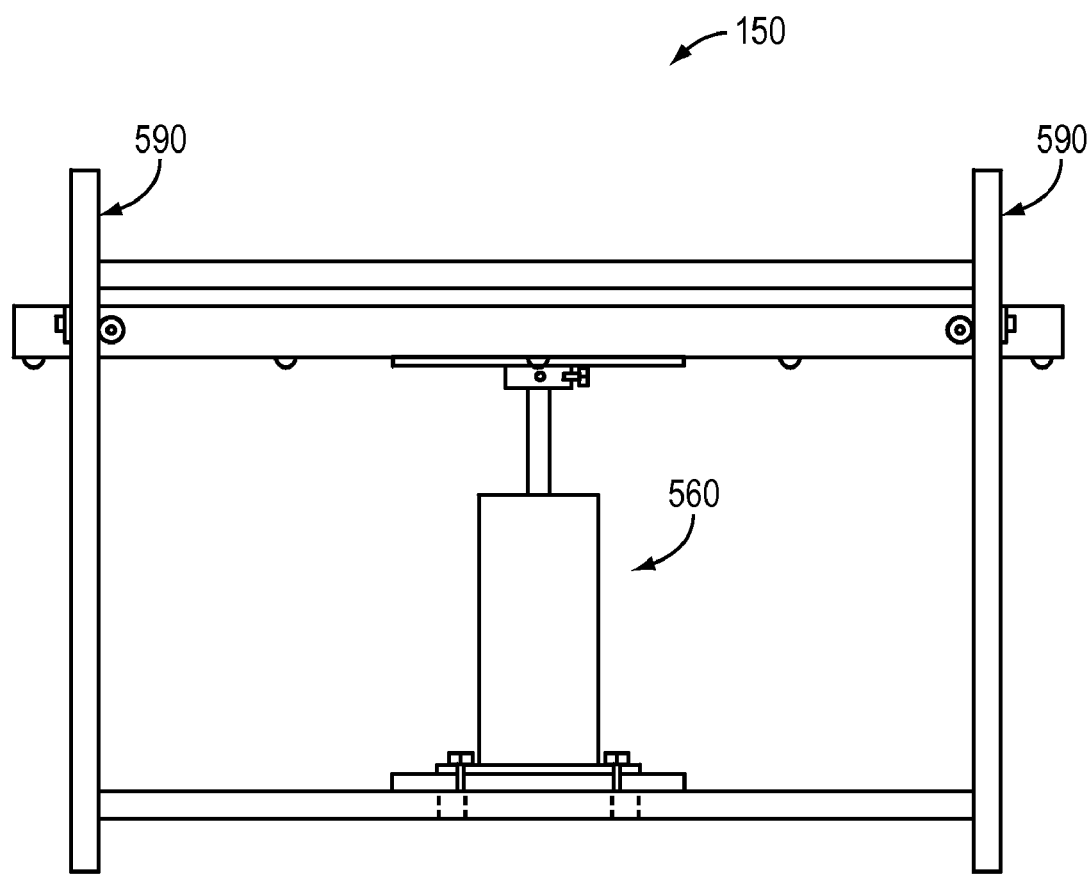
FIG. 5E is a schematic side view of another framing table, in accordance with one embodiment of the invention.

Another example framing table is shown in FIG. 5E. In this embodiment a framing table 150 is approximately 24 feet by 24 feet in dimension and has many components, including two sides 590 to each table that are variable such that they can move to any location depending on the size of the panel. When components are placed on the table, the sides can compress the components together to prepare them for fastening and to ensure the materials will withstand structural requirements. The framing table 150 also sits on a hydraulic lift 560 or jack that allows the table to be raised and lowered. This allows a worker to arrange the components and fasten them together as needed.

Figure 5F:
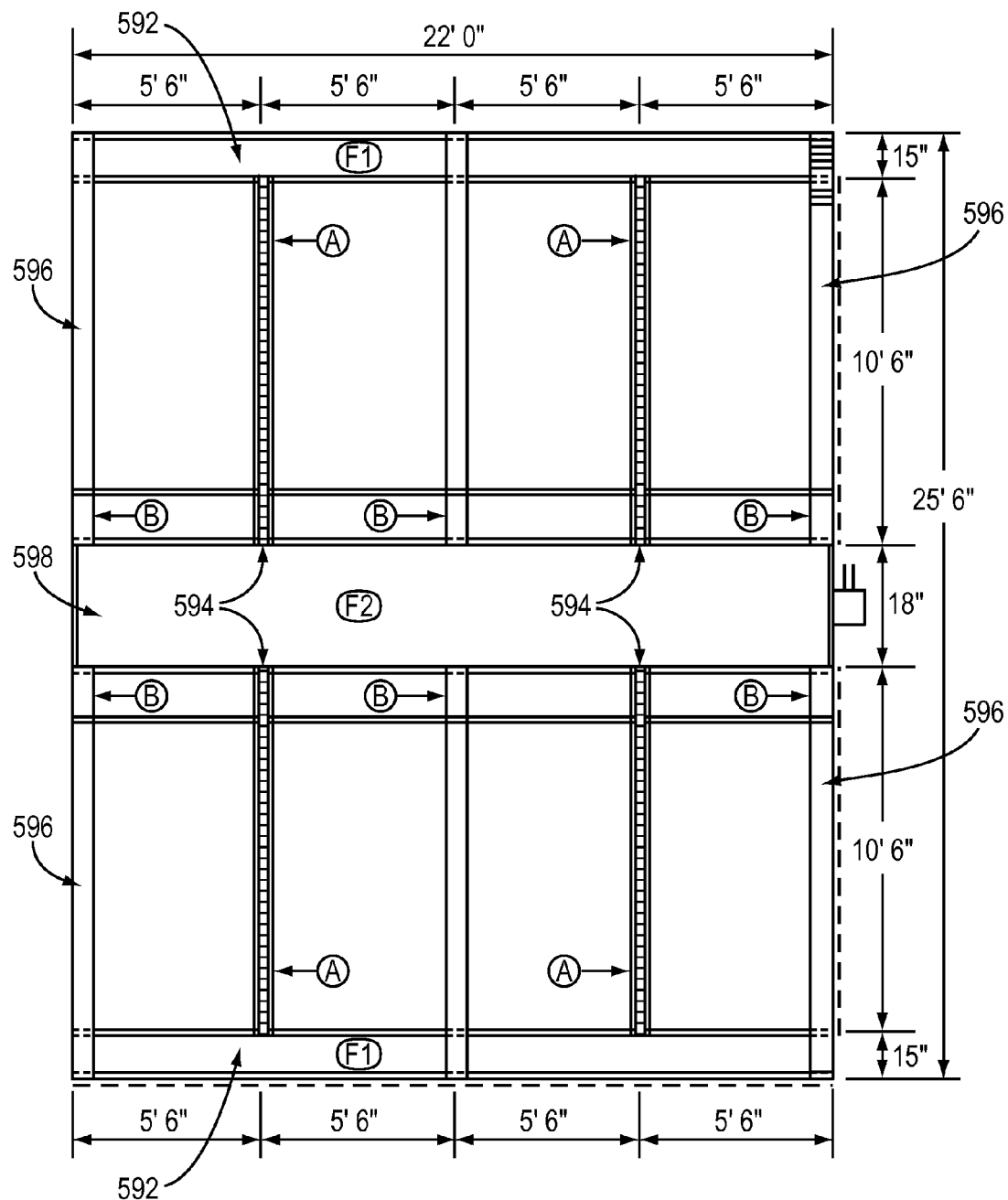
FIG. 5F is a schematic plan view of another framing table, in accordance with one embodiment of the invention.

A plan view of a further alternative embodiment of the framing table can be seen in FIG. 5F. In this embodiment, the panel supports 592 are supported by tracks 594 and runners 596, allowing the panel supports 592 to be moved closer together or further apart as required. A walkway 598 allows a user to easily walk between the two panel supports 592 and associated tracks 594.

Figure 6E:
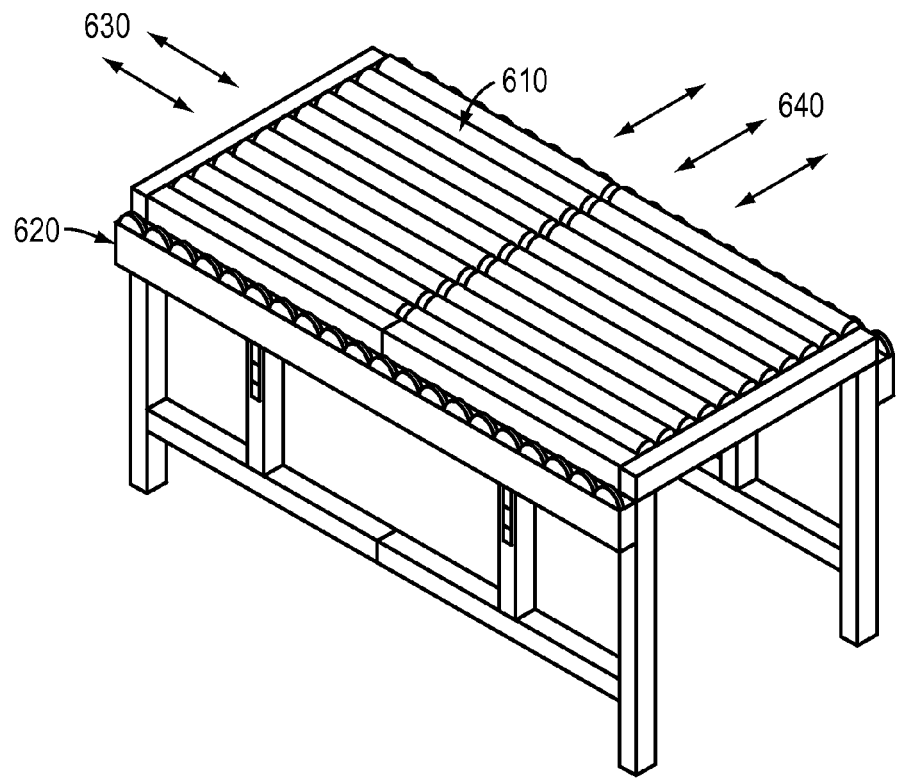
FIG. 6E is a schematic perspective view of the bi-directional roller table of FIG. 6A with the second roller set in a lowered configuration.

After assembly at the framing tables 150, the panels may be rolled off of the framing table 150 and onto one or more bi-directional roller tables 160. These tables allow ease of movement of assembled panels in all four directions, thereby enabling panels to move into free work areas efficiently and with relatively little effort. In one embodiment, there are two sets of rollers positioned at right angles to each other, allowing movement in two axes. At least one set of the rollers can be raised and lowered to engage or disengage the underside of the panel, box, or other material being carried on the tables, depending on the desired direction of panel movement. For example, when the rollers are in a first position, as shown in FIGS. 6A, 6B and 6E, a panel can move in a first direction, and when the rollers are in a second position, as shown in FIGS. 6C and 6D, the panel can move in a second direction.

A bi-directional roller table 160 for the transport of construction materials for use in a material transport system can include a first roller 610 set mounted to the table and configured to support the construction materials on the table and a second roller 620 set mounted to the table and also configured to support the construction materials on the table. The second roller set 620 is movable between a first position below a plane defined by the first roller set 610 and a second position above the plane defined by the first roller set 610. The first roller set 610 is configured to support the construction materials in a first direction of travel, and the second roller set 620 is configured to support the construction materials in a second direction of travel. The first direction of travel is perpendicular to the second direction of travel. The plane defined by the first roller set 610 is substantially horizontal. In an alternative embodiment, at least a portion of one or more sets of the rollers on the bi-directional roller table 160 may be slightly angled, allowing for gravity assisted movement of the panel, or other material being transported, in a set direction.

The bi-directional roller table 160 can also include a moving element for moving the second roller set 620 between the first position and the second position, wherein raising the second roller set 620 to the second position allows the second roller set 620 to support the construction materials on the table. As a result, the panel, or other material supported by the table, can move in one direction 630 on the first roller set 610 when the second roller set 620 is lowered, and in a second direction 640 when the second roller set 620 is lowered, as shown in FIG. 6E.

The first roller set 610 includes at least one row of parallel rollers. A larger number of rows, or longer and/or wider rollers, may be used, depending upon the size and type of materials being carried and the size and shape of the room in which the bi-directional roller tables 160 are being located. The second roller set can include at least one row of parallel rollers.

The moving element used to raise and lower the second roller set 620 can include a manual mechanism and/or a powered mechanism. For example, a motorized or hydraulic lifting mechanism may be used, in one embodiment of the invention, with the motorized mechanism controlled by a user input control, such as a switch or button control. In an alternative embodiment, the control system for the motorized lifting mechanism may be in communication with a production management system controlling a plurality of functions of the panel construction assembly process. A manual mechanism for raising and lowering the second roller set 620 can include, but is not limited to, a winding mechanism, a crank mechanism, a spring mechanism, or combinations thereof.

Figure 6F:
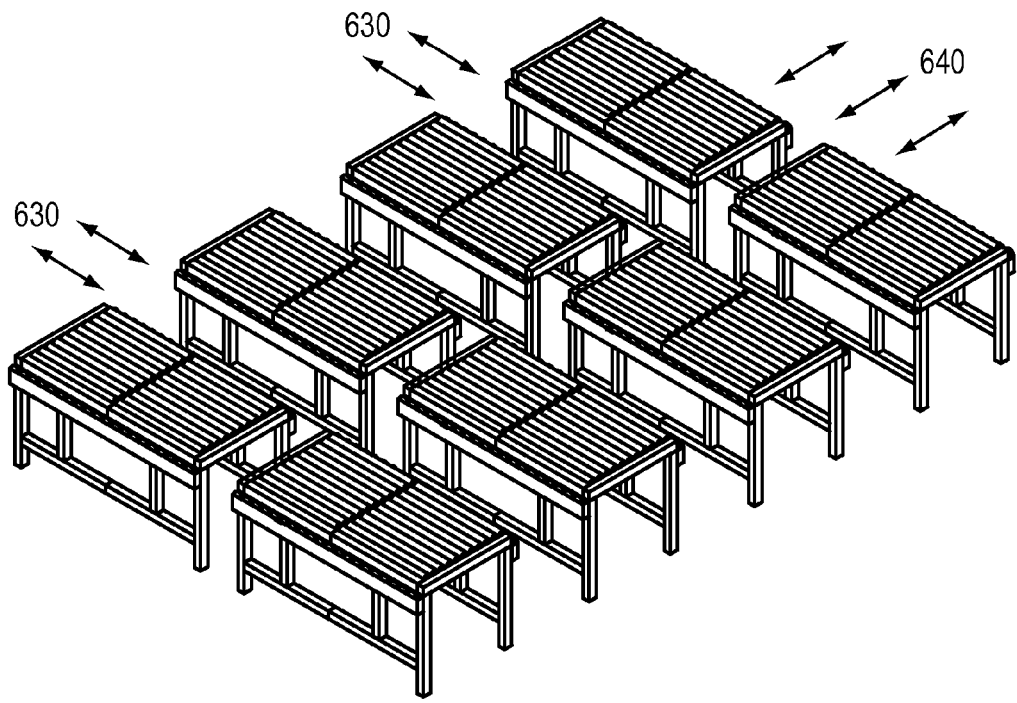
FIG. 6F is a schematic perspective view of a plurality of bi-directional roller tables, in accordance with one embodiment of the invention.

In one embodiment of the invention, a plurality of bi-directional roller tables 160 may be located together, with the space between each table large enough for a user to walk in between the tables, but small enough so that the panels do not fall into the gaps when rolling from one table to the next. The lifting and lowering mechanisms for each table may be controlled separately. Alternatively, a portion of the tables, or all of the tables, may be configured to raise and lower the second roller set 620 together. An example of multiple tables configured to work together is shown in FIG. 6F.

Use of the bi-directional roller tables 160 enables movement of the panels into any open post-processing work station or storage area, further enabling a flexible and dynamic movement pattern. In one example embodiment, the panel may be moved to a sheathing stage 170. The sheathing tables are designed for the application of specific sheathing finishes (e.g., coatings or coverings) to be placed on panels for completion. For example, the sheathing may include insulation for wall panels, or may include painting or other finish of that nature. Once panels are sheathed, they are then ready to be piled and sent to the construction site for installation.

Figure 7A:
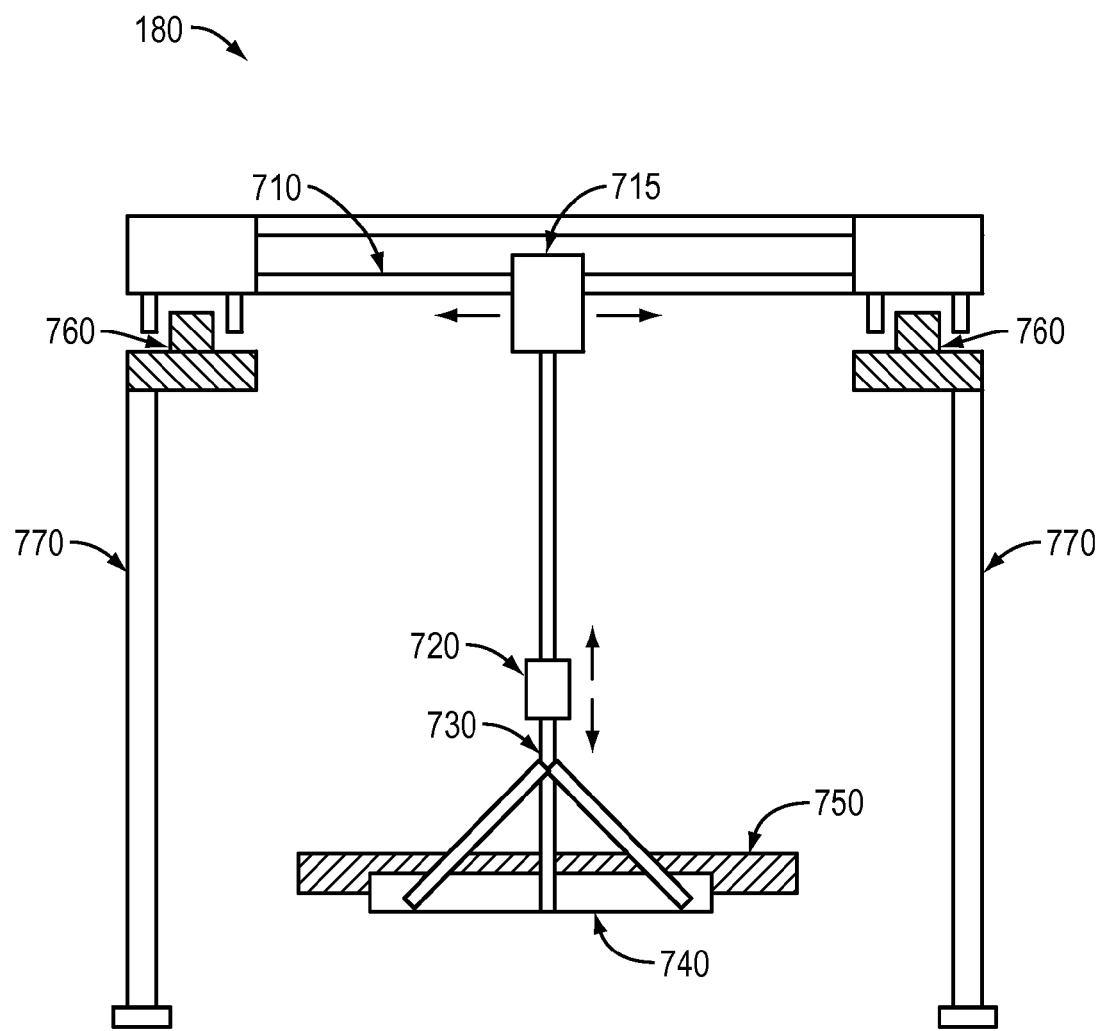
FIG. 7A is a schematic end view of an overhead gantry, in accordance with one embodiment of the invention.
Figure 7B:
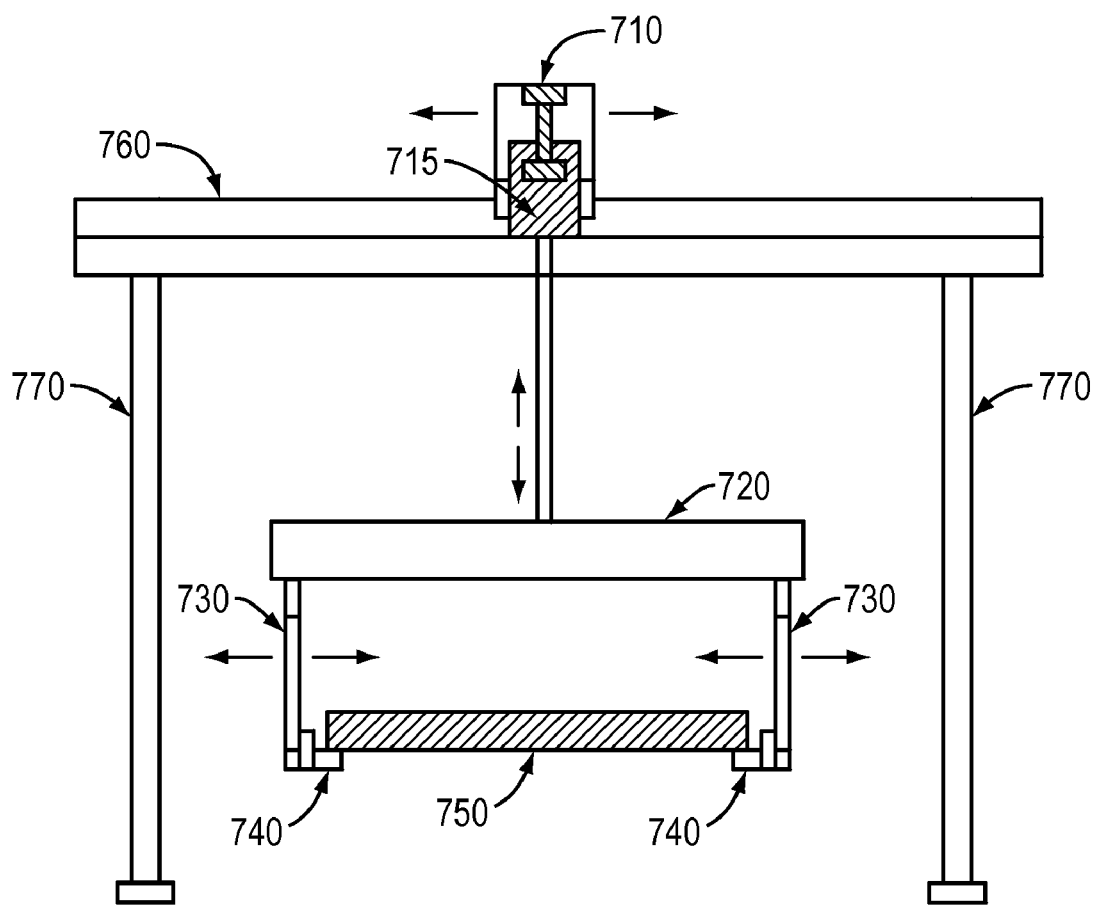
FIG. 7B is a schematic side view of the overhead gantry of FIG. 7A.

Once a panel has been fully assembled and sheathed (if required), it is ready to be moved from the assembly line to either a storage area or a shipping area. This panel transport function can, in one embodiment of the invention, be carried out by one or more overhead gantry systems 180 located beyond the sheathing tables and post-processing tables. This overhead gantry system 180 can lift the panels using a special "arm-like" device, which is specially configured to lift panels that are relatively heavy but manufactured of materials that may be damaged if not lifted properly. In one embodiment, the overhead gantry system is configured to lift these panels and stack them in a preset configuration ready for fastening and shipping to a construction site. An example overhead gantry system is shown in FIGS. 7A and 7B.

In one embodiment of the invention, the overhead gantry system 180 includes a track 710, a support member 720 movably coupled to the track 710 by a coupling member 715, and two support arms 730 coupled to the support member. The support member may be able to be raised or lowered from the coupling member 715. The overhead gantry system 180 further includes a lifting member 740 coupled to a distal end of each of the support arms 730. Each lifting member is configured to engage an edge of a panel 750. The support arms 730 are moveable with respect to each other such that the lifting members 740 can lift and support the panel 750 in a substantially horizontal orientation.

The support arms 730 may be moved with respect to each other by either a manual mechanism or a powered mechanism. A control system may be used to power and control the movement of the support arms 730 with respect to one another, and control the movement of the coupling member 715 within the track 710. The control system can further control the vertical movement of the support member 720.

The track 710 can be movably mounted on a second pair of tracks 760, which may be structurally supported by support members 770, and/or be mounted to the structural supports of a building. As a result, the panel may be lifted or lowered and moved in two horizontal axes along the track 710 and the tracks 760. This allows the panel 750 to be picked up from a given location, such as a sheathing table, and delivered to any point within the range of the track system.

In one embodiment, the overhead gantry may include a crane element associated with the coupling member 715 to lift and lower the panel when supported by the lifting members 740. This crane element may involve a winching, winding, pulley, or other appropriate lifting mechanism.

In an alternative embodiment, the overhead gantry may be replaced by one or more crane systems. The crane system may be a portable crane or be a crane system permanently mounted within a manufacturing building.

Figure 7C:
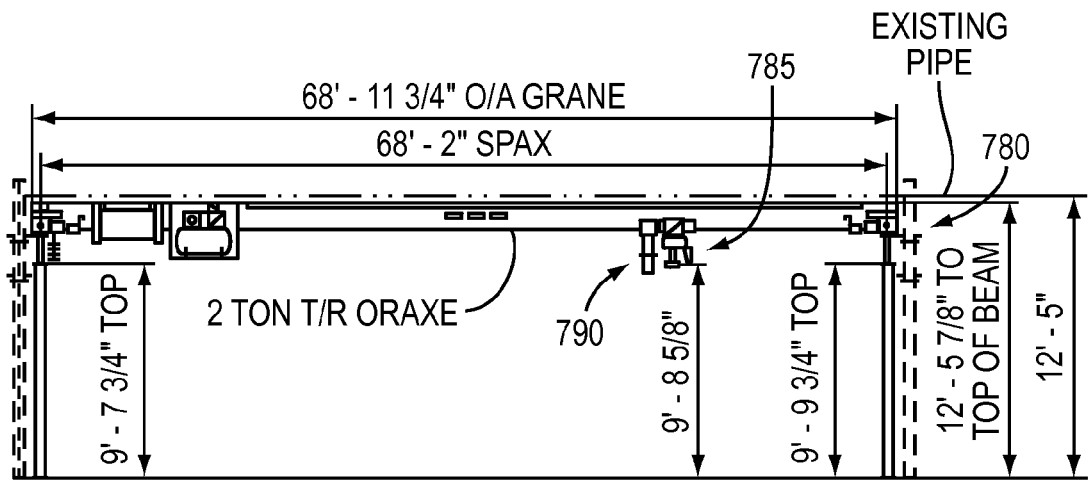
FIG. 7C is a schematic side view of an overhead crane, in accordance with one embodiment of the invention.
Figure 7D:
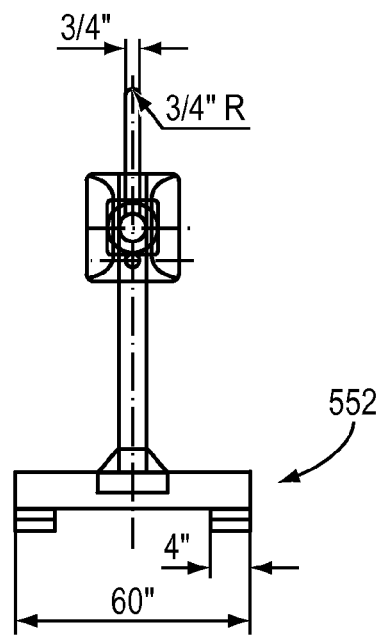
FIG. 7D is a schematic side view of the crane arm of FIG. 7C.

An example of an overhead crane system is shown in FIGS. 7C and 7D. In this embodiment the overhead crane system includes an x/y access frame 780, with a crane 785 and grabbing device 790 which can lift panels and move them in any direction. The grabbing device 790 can include a handset with controls which enable the grabbing device 790 to move in any direction within the limits of the x/y access frame 780. Referring to FIG. 7D, the grabbing device 790 may need to hold panels that weigh up to 1,500 lbs but yet are delicate and can easily be damaged. As such, the grabbing device 790 must be configured to provide sufficient lifting and support force to lift and hold the panels, but not produce any force on the panel to damage it in any way. In an alternative embodiment, the grabbing device may be a hook, a clasp, or any other appropriate mechanical element for hooking to a panel or a support strap attached to the panel.

In an alternative embodiment, a panel lifting element may be incorporated into any of the described overhead gantry or crane systems to enable panels of over 4,000 lbs to be supported and transported safely. This panel lifting element may be configured to lift and support a single panel, or lift a plurality of stacked panels. As a result, the overhead gantry and crane systems can be used to load completed panels and/or panel kits directly onto transport vehicles Another aspect of the invention can include information technology systems and methods for the utilization and control of the manufacturing systems described herein. These information technology systems and methods may include, in certain embodiments, systems for manufacturing components for assembly into a panel, the creation of housing kits from panels manufactured within the facility, methods of designing an enclosure using such panels, and/or a computer aided design tool for designing a structure using prefabricated panels.

Figure 8:
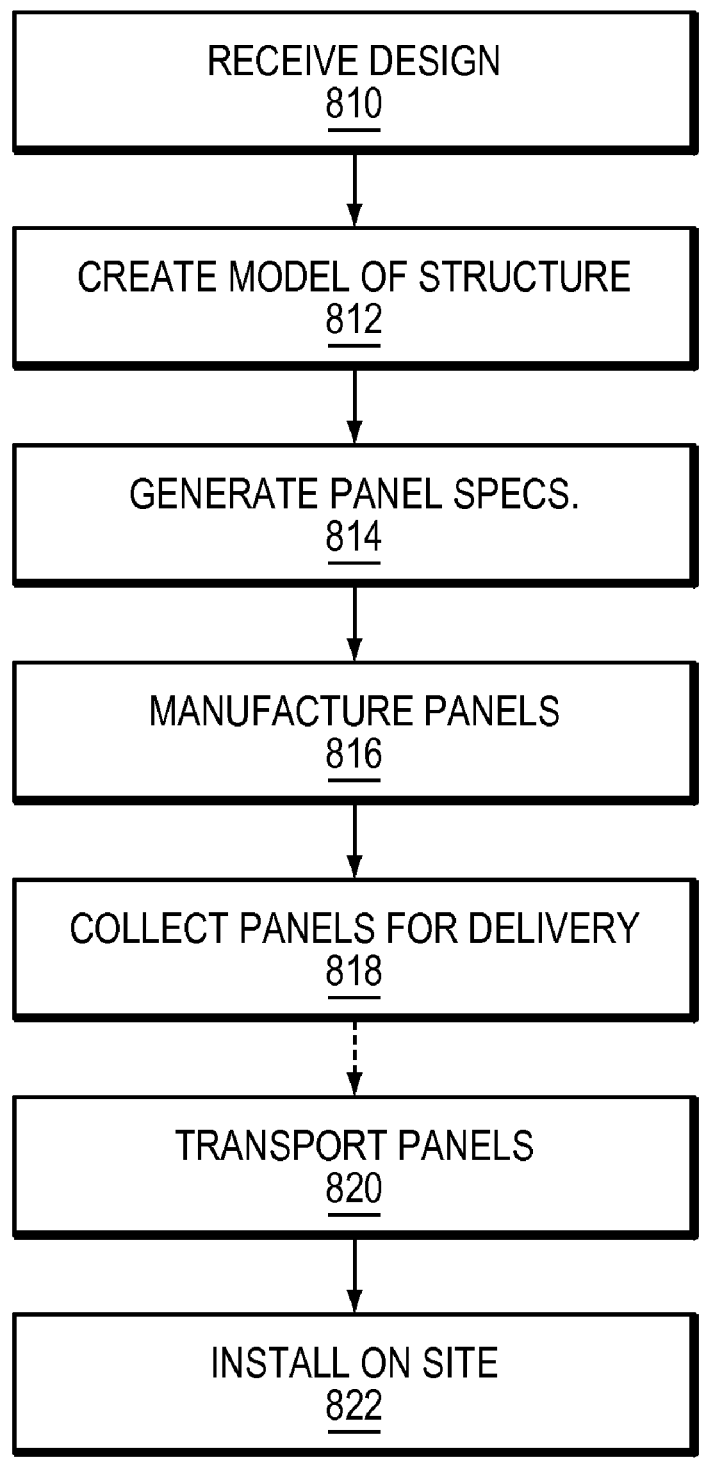
FIG. 8 is a flowchart of a method, in accordance with one embodiment of the invention.

Referring to FIG. 8, in one embodiment, a process for manufacturing a structure may include some or all of the following steps. The process may include receiving a design for a structure (STEP 810). The design may be, for example, an architectural design, and/or an engineering design. The design may be based on another design, a previously developed design, or may be an original or custom design. The design typically will specify such items as the size and shape of the structure, and present some or all of the desired architectural features.

The process may further include creating a model of the structure in response to the design (STEP 812). The model, typically, will be a virtual model created in a computer-aided design software program, such that the model is a virtual representation of the structure. Preferably, the model includes a number of panels, each of which has a number of cold-formed steel members that are assembled into one panel unit. Creation of the model typically will involve the use of pre-designed panels, but may involve the creation of some or all custom panels. Creating the model may involve selecting panels that will be used to construct the design such that the engineering and architectural requirements for the structure will be met. In response to the panels that are selected for the model, the design software may generate specifications for the panels, bills of materials for panels, panel fabrication drawings, and panel installation drawings (STEP 814).

The process may further include managing in a manufacturing facility manufacture of panels selected in the model (STEP 816). This may be performed as described herein, in a facility as described above. This may be performed, for example, according to the bill of materials and the fabrication drawings. This may be performed for some, most, or all of the panels. For example, it may be possible to manufacture some portion of the panels in another facility, or on site, and the manufacture in the facility of some or all of the panels may be complete, partially complete, or incomplete. In one embodiment, all of the panels are manufactured in a manufacturing facility, so that the work that needs to be performed on site is primarily assembly. It should be understood that, in general, more work done in a manufacturing facility will result in less work that needs to be done on-site.

The process may further include collecting in the manufacturing facility the panels for delivery to a construction site for the structure (STEP 818). Other necessary parts may also be assembled for delivery. In one embodiment, panels are collected in the approximate order that they will be needed for assembly, to make construction that much more efficient. In one embodiment, the panels are collected in piles, so that they can be fastened together and loaded onto a truck. In one embodiment, the panels are collected in a manner that allows the panels to be moved, but not damaged. In one embodiment, the piles are made such that the panels to be used first are on the top, and the panels are in the pile in the order that they will be needed for construction. In one embodiment, manufacture of the panels in the manufacturing facility is accomplished such that the assembled panels can be piled in order.

The process may further include transporting the panels to a construction site (STEP 820). Other parts may also be transported. This may be accomplished by ground transport (e.g., truck(s)), rail, air, or any other suitable transportation, although typically, it will be accomplished by truck. The panels, stacked and fastened as above, may be loaded onto a truck and driven to a site, where they may be unloaded and unfastened for construction.

The process may further include, at the construction site, assembling the panels into a structure (STEP 822). This may be accomplished in any suitable manner. In one embodiment, construction drawings generated at the time of design will be used to assemble the panels. In one embodiment, the panels are each numbered and/or otherwise marked and/or labeled to facilitate assembly. In one embodiment, a crane is used on site to move the panels from unloading to the assembly location. The crane can lift each panel, and place it for assembly, for example, by screwing or welding, as needed.

Figure 9:
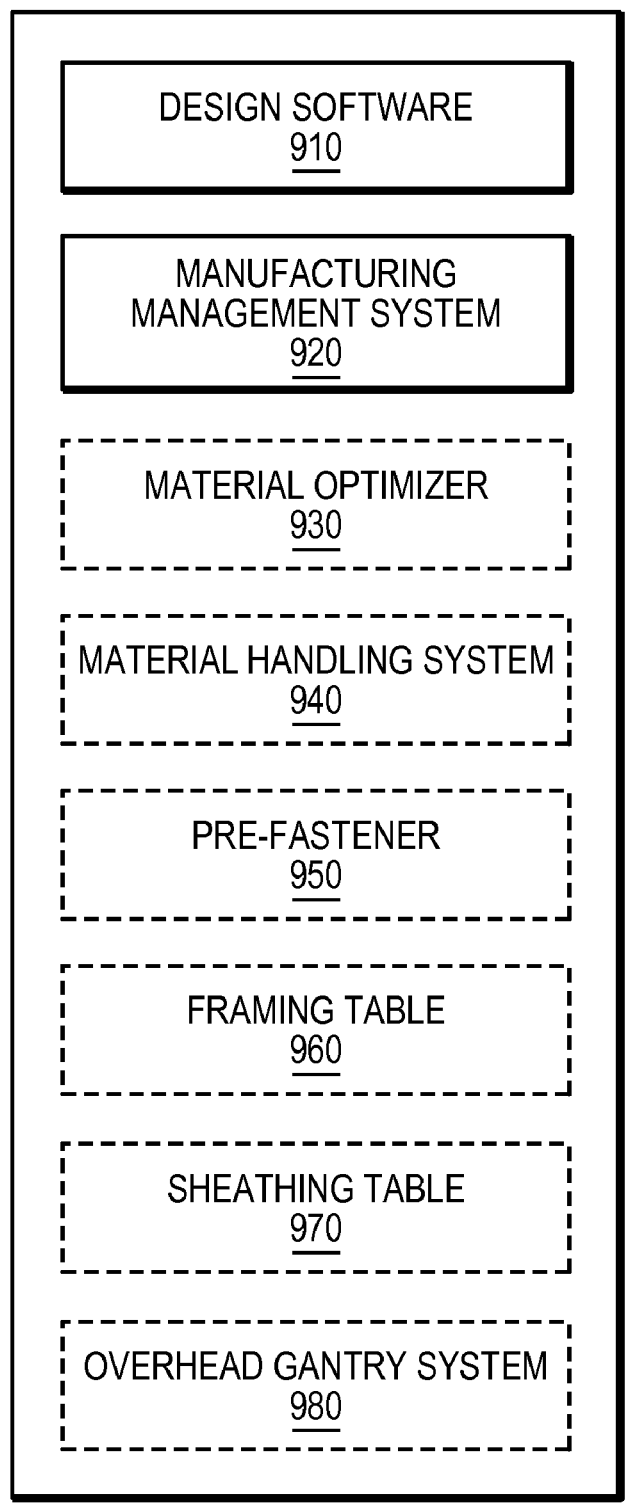
FIG. 9 is a block diagram of the components of an embodiment of the invention.

Referring to FIG. 9, in one embodiment, a manufacturing system for manufacturing a steel structure may include any or all of the following features.

The system may include a computer-aided design system 910. The system may be any sort of computer-based software and/or hardware system that is suitable for the functions described here. The design system may create a model of the building structure, and facilitate specification of the panels to be used to construct the structure. The design system may facilitate generation, or generate, bills of materials for panels, panel fabrication drawings, and panel installation drawings in response to panel selection and panel specifications. In one embodiment, the design system is a software system that runs on a standard personal computer configured to have sufficient memory, processing power, and storage to perform the functions described here. The design system 910 may interface with databases and/or networked storage, and other software and hardware systems in the performance of its functions. In one embodiment, the design system 910 supports generation of identifiers for each panel in a structure. These identifiers may be provided on documentation and labels, and may be associated with manufacturing equipment configuration parameters.

The system may include a manufacturing enterprise management system 920 for managing manufacture of panels. In one embodiment, the management system 920 facilitates management of manufacture according to the panel specifications and fabrication drawings generated by the design system 910. Preferably, the manufacturing enterprise management system facilitates automated processes, so as to maintain quality and efficiency. In one embodiment, the management system tracks each component and subcomponent with a bar code identifier, such as described with respect to FIG. 19, so that a worker can determine what needs to be done with the component simply by scanning the bar code at his or her station. Automated or computer-based tools at a station will use the bar code to communicate or interface with the management system 920 to provide information to the worker to accomplish manufacturing tasks.

The system may include a material optimizer 930 for providing metal components for manufacturing panels. In one embodiment, the optimizer cuts metal material and forms the metal into a part of a panel according to the specifications for that panel. As part of the process, each part is assigned an identifier, and a bar code label. In this way the system can recognize the part as it appears at each station, and guide the manufacturing process. In one embodiment, the panel is formed of members, each of which is cut and formed by the material optimizer 930. In a preferred embodiment, the optimizer 930 cuts steel from a coil. The panel components are cut and shaped by the optimizer 930, so as to make efficient use of the metal material. In one embodiment, the optimizer 930 may include a de-coiler or straightener, cutter, overhead gantry system for moving material, and/or a roll former.

The system may include a material handling system 940 useful for moving collections of parts to assembly stations. The parts then may be assembled as described in the fabrication drawings. In one embodiment, the material handling system 940 includes a tray for collecting parts. The parts may include parts made by the material optimizer and other parts to be used in panel assembly. The material handling system 940 may include a rails and/or a conveyor for moving the tray from station to station in a flexible manner and with relatively minimal effort by workers.

The system may include a pre-fastener 950 for fastening parts into a subassembly. The pre-fastener 58 may be any sort of welder, riveter, screw-gun and/or other fastener that can be used to assemble metal parts. The pre-fastener 950 may be used to assemble parts as described in the fabrication drawings. The pre-fastener 950 may use or include a robotic arm to help facilitate the efficient manufacture of parts. The pre-fastener 950 may include dynamically-generated aids for manufacture, such as a laser-guided marking system for indicating where fastening is needed.

The system may include a framing table 960 for assembling parts and/or subassemblies into a panel. In one embodiment, the framing table 960 includes a screw gun for quickly assembling pieces into panels. In one embodiment, the panels are assembled as described in fabrication drawings.

The system may include a post-fastener (not shown) for fastening assembled parts. The post-fastener may be, for example, any sort of welder, riveter, screw-gun and/or other fastener that can be used to assemble metal parts. The post-fastener may use or include a robotic arm to help facilitate the efficient manufacture of parts. The pre-fastener may include dynamically-generated aids.

The system may include a sheathing table 970 for applying a coating or covering to a panel. In one embodiment, the panels are coated or covered as described in fabrication drawings.

The system may include an overhead gantry system 980 including a crane and a grabbing device for holding an assembled panel and collecting panels for delivery.

Each of these components may have various sub-components that may be integrated in a manner resulting in efficient panel production, and building manufacturing process.

The following is further description of embodiments of these components. It should be understood that these components have efficiencies when used together, but it is contemplated that it is possible for each of the components to be used with none, some, or all of each of the others, as well as other technology, in a variety of configurations. It also should be understood that the embodiments described are exemplary, and variations will be apparent to those skilled in the art.

Design Application

Figure 10:
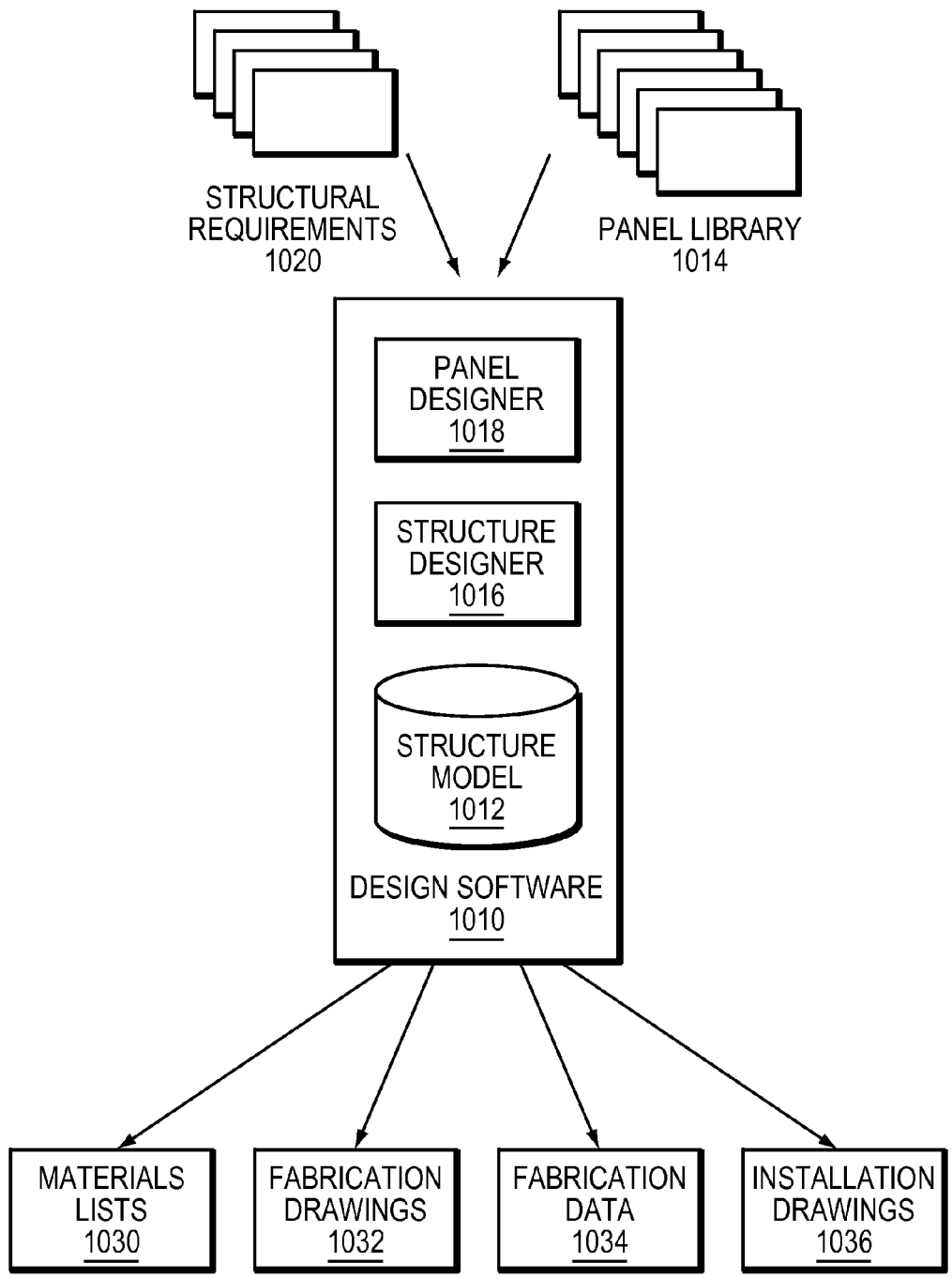
FIG. 10 is a block diagram of a design system, in accordance with one embodiment of the invention.

Referring to FIG. 10, in one embodiment, a computer aided design application 1010 enables designers to create a virtual model 1012 of a building structure. The design application 1010 enables a user, typically a design professional, to create and detail residential and commercial building structures in light steel. The design application 1010, may receive as input a collection of panels that have been previously designed 1014. The design application 1010, may also take as input structural and/or other requirements or constraints for the structure to be designed.

The design application may use previously designed panels from a panel library 1014, and may also allow for modification and/or custom design of the panels. The design application 1010 may include a panel designer 1018, for designing and configuring panels to be used in the structural model 1012. The design application also may include a structure designer 1016 for creating and modifying a model of a structure using the designed panels as building elements. Structure requirements 1020 may be provided by building codes, engineers, and so forth. In one embodiment, the design application facilitates the integration of engineering/construction knowledge and experience and allows designers to create complete 3D parametric models based on specifically defined engineering data. The framing process may run continuously on creation of any new objects or with any modifications made to existing objects. Wall, floor and roof panels may be custom entities and behave as real-life objects. Validation functionality checks key aspects of the elements drawn in the model space and generate a report to allow for review and corrections.

In some embodiments, the design system contains a parts database that includes a number (e.g., 10, 14, 25) of base product profiles and a number (e.g., 4, 8, 12) of joist products. This database may be architected to allow for future expansion and configuration. Parts managed in the database are virtual solid objects with full physical properties including dimensional measurements in metric and imperial for width, height, gauge thickness and weight.

In one embodiment, the design application can run on the Microsoft Windows operating system and uses an AUTOCAD™ design engine. The AUTOCAD engine provides a platform that is an accepted standard worldwide for architects and designers alike who are required to produce working construction drawings. Use of this standard allows for support and training for users, and allows the solution to be developed in the Visual C++ and ObjectARX programming environments.

The output from the design software 1010 may include material lists and specifications 1030 of individual components used in the building, fabrication drawings 1032 that describe how a panel should be manufactured, fabrication data 1034 (e.g., export data files) such as can be provided to manufacturing management and manufacturing equipment for manufacture, and panel lists and installation drawings 1036. Additional output files (e.g., .pnl files) may be provided to enable integration with standard industry laser templating technology as well as other types of automated manufacturing machinery. The drawings and other output data may be dynamically updated when modifications are made to the building model.

Figure 11:
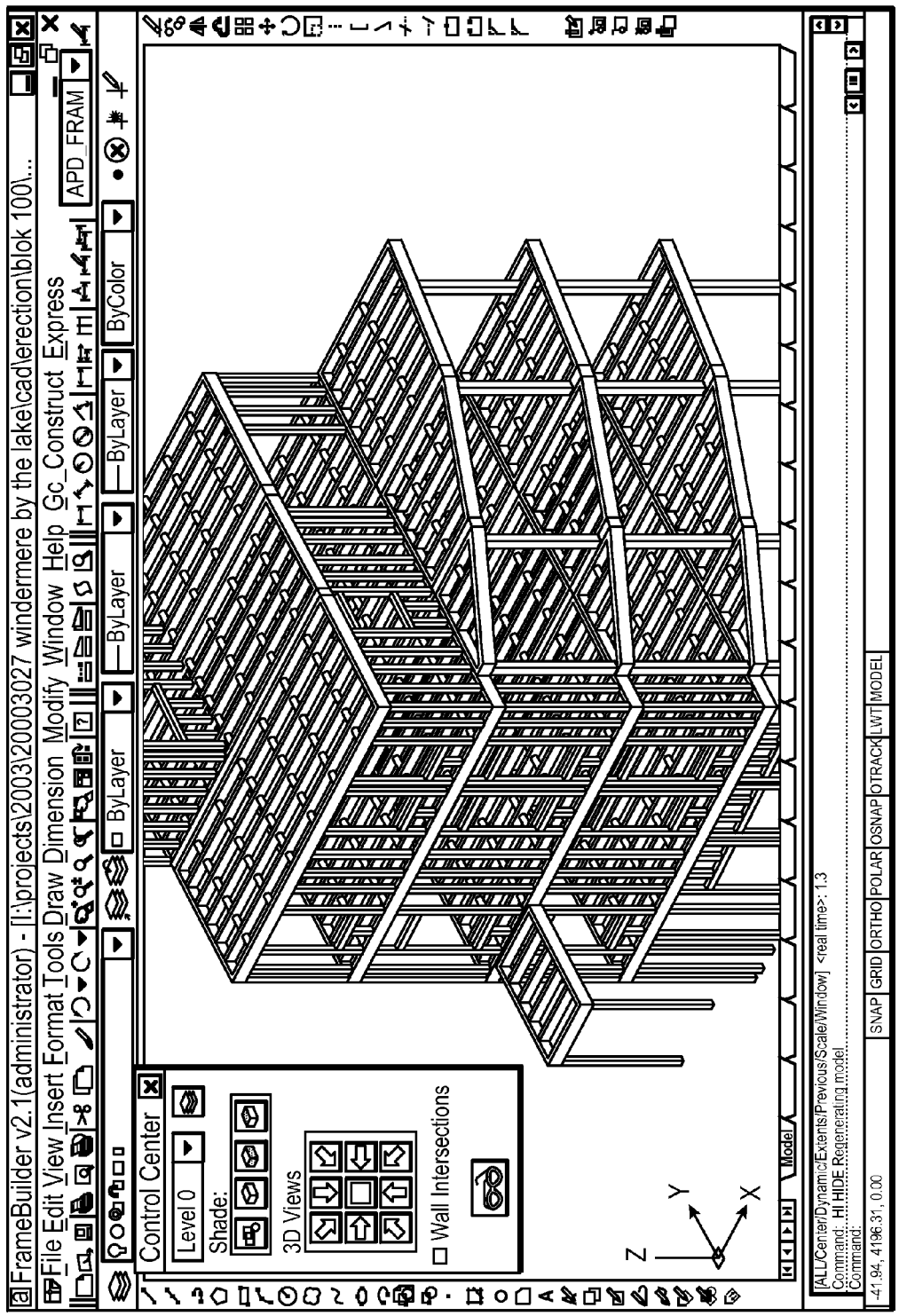
FIG. 11 is an exemplary display of a parametric model of a structure, in accordance with one embodiment of the invention.

Referring briefly to FIG. 11, an exemplary display of a parametric model shows a portion of a structure that has been designed using panels according to an embodiment of the invention. The structure may be assembled from various panels, and manipulated and modified in the virtual environment. For example, changes can be made by replacing panels with different panels, or by modifying the panels themselves.

Figure 12:
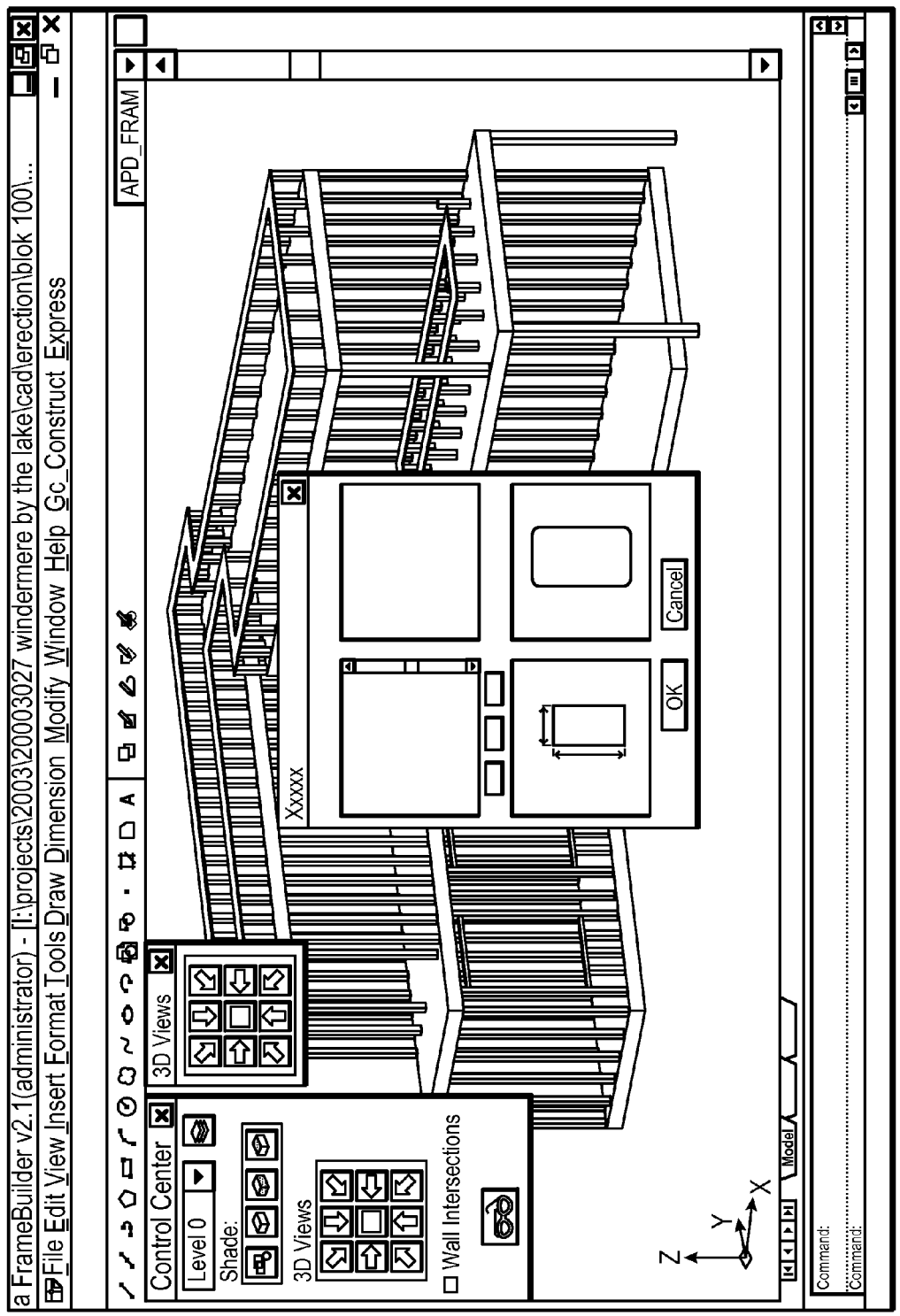
FIG. 12 is another exemplary display of a parametric model.

Referring to FIG. 12, another view of a parametric model of a structure is shown, with a display of the physical properties of a panel. Again, by using panels as a unit of design, it is possible to efficiently create a structure that can be manufactured.

Referring to FIG. 13, fabrication drawings, also referred to as panel drawings, provide information for fabricating panels. An exemplary material list for a panel as may be included in fabrication drawings is shown. The material list includes studs, tracks, and miscellaneous parts. The studs are metal members, typically vertical, that form the panel. As shown, each stud has a number as well as a description identifier. The length, quantity, and locations for knockouts in the stud are provided. Again, the studs are modular parts that, once designed, can be reused in the model, and also can be modified for specific or custom use.

Tracks also are specified in the material list. Tracks are members, typically horizontal that are used to hold studs in place, and provide the framing for the panel. Again, each type of track can be specified in the model, and manufactured to order in the manufacturing facility. Miscellaneous parts are also specified. In this example, there are braces, which are cross members used to help support the structure of the panel. In this example, there are braces BR and BR-A. Other parts FS22 and UA are also specified.

The material list may be used to identify the parts that are needed to assemble a panel. In one embodiment, the material list is included with a fabrication drawing for a panel, so that the manufacturing facility personnel can easily determine from the assembly drawing the parts that are specified and how they should be put together. Some of the parts themselves may be manufactured, as described further below, for example by the material optimizer, and other parts may be purchased externally, and provided for manufacture.

Figure 14:
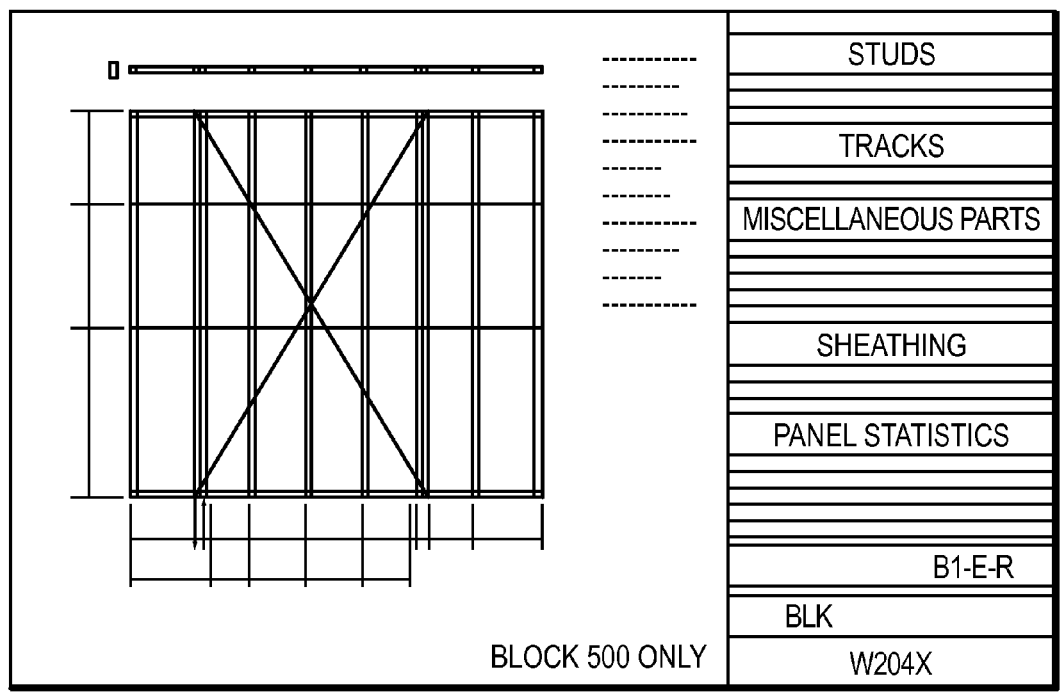
FIG. 14 is an exemplary panel assembly drawing, in accordance with one embodiment of the invention.

Referring to FIG. 14, fabrication drawings may indicate panels that are assembled in manufacture. An exemplary fabrication drawing for a wall panel, such as that shown in the figure includes a materials list as described above.

For example, the fabrication drawing includes information listing the metal members, shown as studs S8, S9 and tracks T7, and other miscellaneous parts (Hole, FS-1, BR, and US-1) that are included in this exemplary panel. A specification of the type of sheathing to be attached to the panel is also specified. Panel statistics such as the size and the weight, in imperial and metric measures, are listed. Dimensions and size are also summarized further below.

In addition to other information, the lot number BLK and the panel identifier W204X are specified. The panel identifier is unique for each lot, so that each panel can be specifically designed and tracked.

Also included on the drawing is an indication of whether and how holes should be punched, whether and where batt insulation should be attached, the location for strap bracing (e.g., front, back, or both), and an indication of sheathing. Also included is a diagram that shows how the pieces fit together, and the location(s) of any brackets, straps, studs, or other parts.

The panel drawing specifies how the parts should be assembled, with measurements and connections specified.

Figure 15:
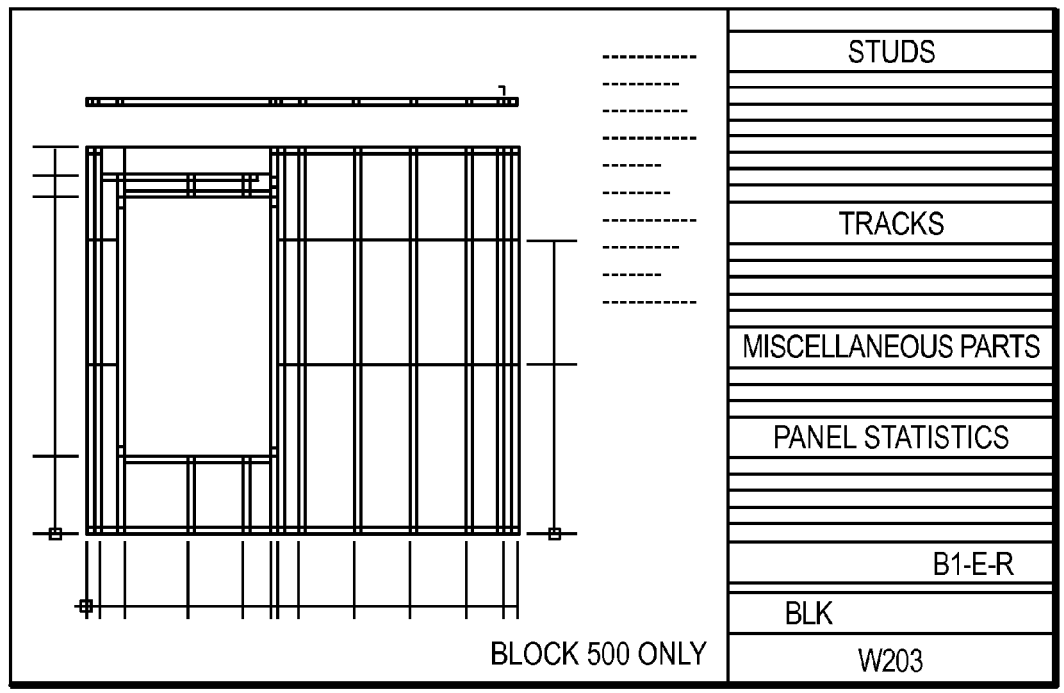
FIG. 15 is an exemplary panel assembly drawing, in accordance with one embodiment of the invention.

Referring to FIG. 15, an exemplary fabrication drawing for a panel with a space for a window shows the members that are needed, as studs and tracks as wells as miscellaneous parts, such as braces. The size and weight of the panel is specified, as well as any additional specifications, such as punched holes, batt insulation, strap bracing, and sheathing. Also, the panel identifier W203 is shown.

Figure 16:
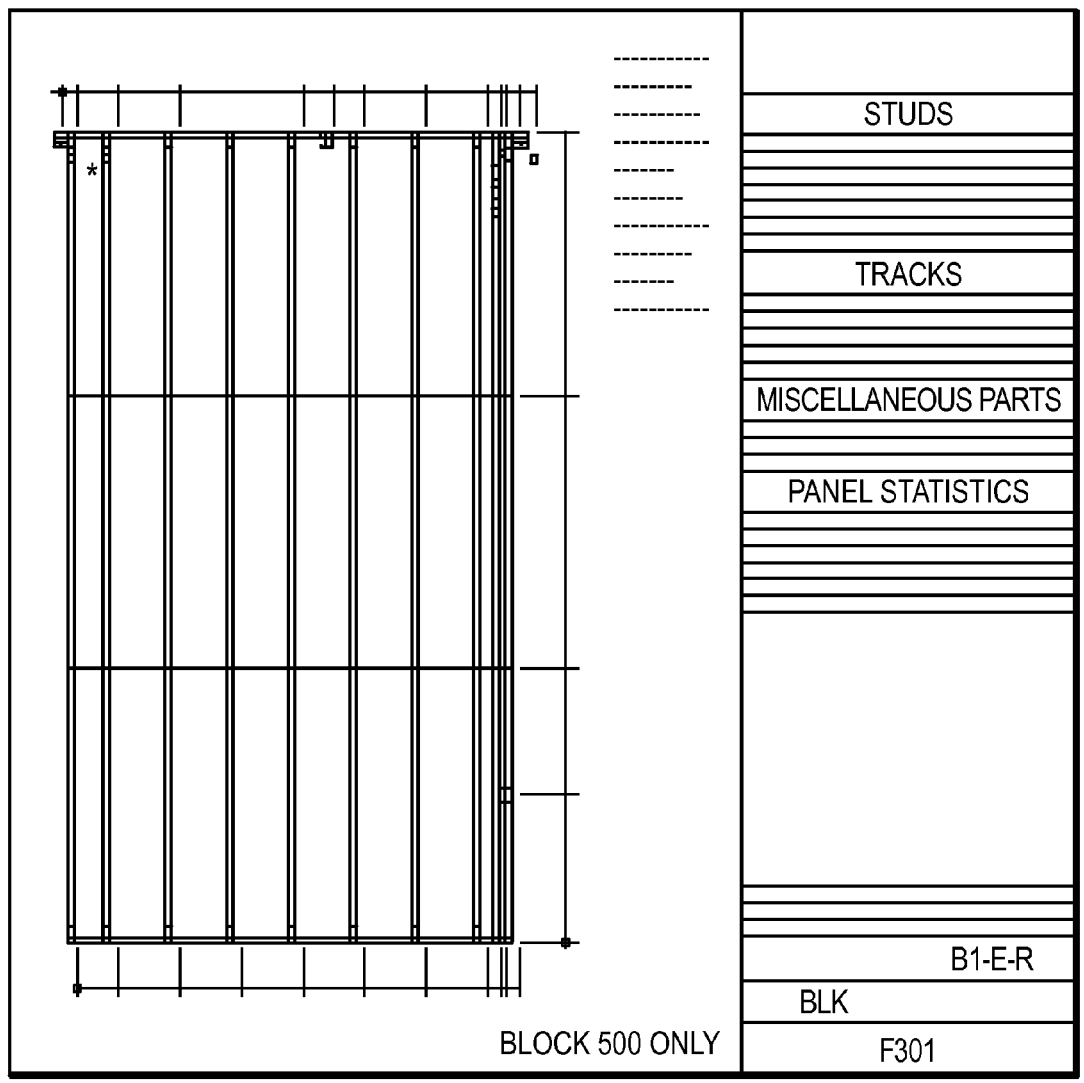
FIG. 16 is an exemplary panel assembly drawing, in accordance with one embodiment of the invention.

Referring to FIG. 16, an exemplary fabrication drawing for a floor panel is shown. Again, studs and tracks are specified, along with miscellaneous parts. The information in each of these panel fabrication drawings can be used to select and manufacture the parts that are needed to manufacture the panel.

Figure 17:
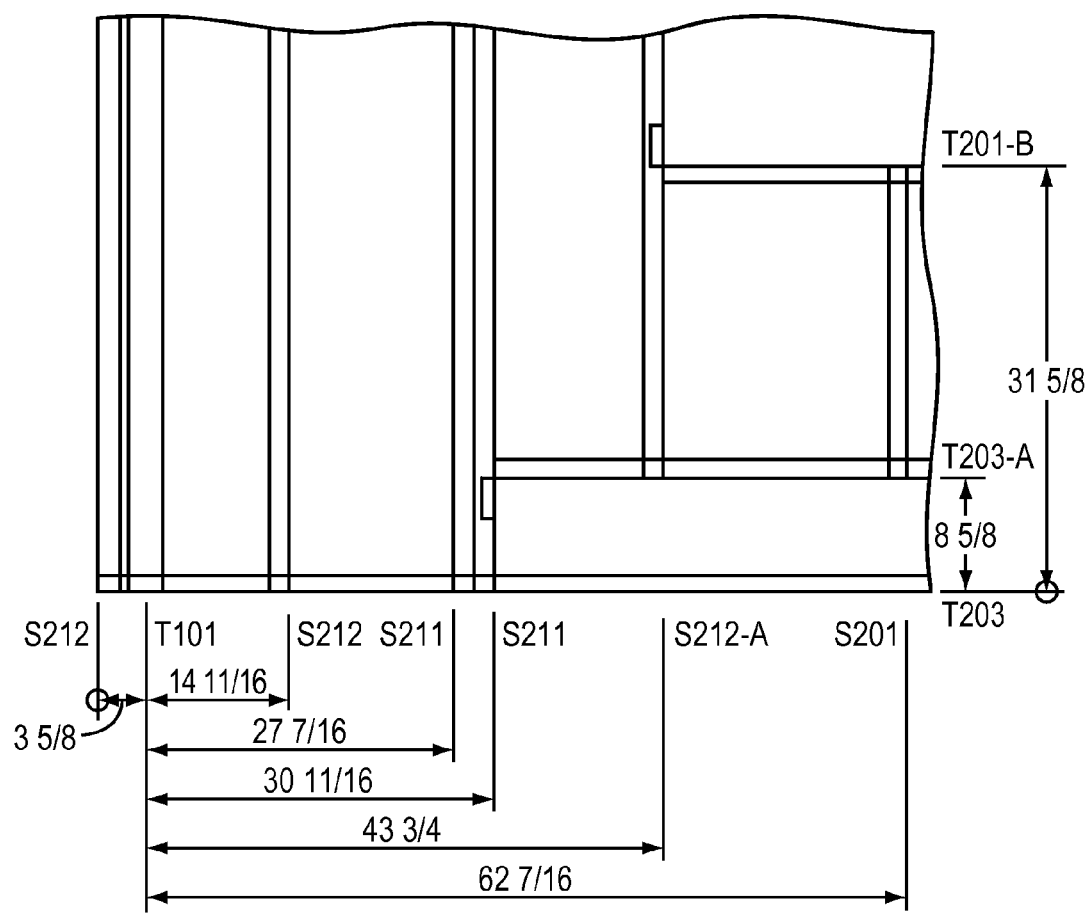
FIG. 17 is a portion of an exemplary panel assembly drawing, in accordance with one embodiment of the invention.

Referring to FIG. 17, a close-up view of a panel drawing shows the measurements used for fabrication of the panels, as well as the different parts to be used. Thus, the panel drawing provides guidance to the manufacturing facility personnel about how the panel should be assembled from the parts specified.

Referring to FIG. 18, an exemplary display of data that is exported from the design software may be imported into a manufacturing management system. The data includes the types of parts, and specifications for the parts. The data may also include other information that may be used to manufacture the various parts. As shown, the data is in text format, but may be in another format, such as a self-describing language such as XML, or in a database or binary format as other examples.

Figure 19:
FIG. 19 is an exemplary bar code label, in accordance with one embodiment of the invention.

Referring to FIG. 19, in one embodiment, the design system supports generation of identifiers for each panel in a structure. These identifiers may be provided on documentation such as the fabrication drawings in FIGS. 11, 12, and 13 and labels such as shown in this figure. A label may include a unique barcode identifier for the panel (*49334*), as well as an indication of the project (ARRW-BLK2-11), the Work Order (2226), the Sequence Number (20), and the panel number (W05X). This identifier may be assigned to a panel by the CAD system, and used for the assembly of the panel and for the assembly of the structure. For example, fabrication drawings may be generated for the panel, and used to collect the parts for, and assemble the panel. A label with the identifier may be affixed or kept with the parts for assembly, and ultimately affixed to the assembled panel, such that the label may be used to identify the panel in construction, as the structure is assembled. The label may also include a transceiver, such as an RFID tag, to allow an identifier to be read wirelessly.

Installation or construction drawings, for example, may refer to each of the panels by their identifier. Assigning a unique identifier to a panel, and using that identifier throughout the process, provides great efficiency gains in the manufacture and assembly of structures. These drawings are used by installation crews on job sites that indicate how each panel needs to come together on a building site to create a building structure.

Manufacturing Management Application

Another software application may be integrated with the CAD application and manages manufacture of the panels. Wireless technology may be used to track the panel production process. In one implementation, each panel is bar-coded with labels that may be tracked throughout the manufacturing process. The application may identify the materials that are needed and provide an automated purchasing process. In various implementations, the management system may provide such enterprise functions such as job costing (in real time), work order management, inventory management, receiving, purchasing, shipping and incident tracking, and production management, all specific to the cold-formed steel structure industry. The system also facilitates the transfer of information from the design application to material control systems so that panels can be fabricated and built.

In one embodiment, the management software includes a system administration module, an order management subsystem, a purchasing subsystem, a production management subsystem, a workforce management subsystem, a shipping subsystem, and a business analytics subsystem.

The system administration module allows for initial system set-up and configuration. Company and customer/vendor specific contact information may be defined, as well as interfaces and connections to other system.

An order management module may provide a central point of managing job specific information. This may include project information and control, and assignment of resources. This also may include creating work orders for production of panels and trusses. It allows jobs and work orders to be imported from the design software, and for the release of work orders for purchasing. It also may include detailed estimate tracking, milestone dates and tracking, communications management, incident tracking, and project change management controls.

A purchase order subsystem allows creation and management of detailed purchase orders. For each purchase order, material and material costs may be allocated to the appropriate account for reporting and third-party interfaces (e.g., to an accounting system). Management of purchase orders includes tracking of purchase order numbers, access and modification of vendor contact information, access to price lists, and access to a product library that provides the information needed for appropriate allocation to account types. For example, the product library may include various account types (e.g., job, consumables, fixed assets, operating, non-operating), categories (e.g., building, structural cold-formed steel, communication, computer, consumables, structural hot-formed steel, insulation, non-structural cold-formed steel, etc.), sub-categories (e.g., breakshape, light gauge steel, clip angles, etc.), product codes, product descriptions, and units of measure.

The purchase order subsystem also allows for material ordering (e.g., per project or per panel), adding an order to a batch, viewing standard material for a panel, exporting of data to a vendor file format, and updating job management information based on order status.

A production management subsystem allows plant managers to allocate and redirect orders to production according to customer timelines and the availability of labor and materials. The production management system receives purchase orders that are created, and allows for creation, editing, and managing of work orders. It also enables the generation of bar code data for use in production. The production management system also allows users with appropriate permissions to view the queue of jobs, and to manage and release jobs to production. The production management system facilitates the sequencing of jobs, work orders, and panels, such that the panels can be piled as desirable for efficient use upon installation.

The production management subsystem also allows for accurate tracking of all materials and panels in production by status type, for example: picking, pre-welding, GFT, post-welding, sheathing, staging, loading, or post production (e.g., rework, meeting, material handler/truss, or maintenance).

The production management subsystem also allows for integration with panel identification (e.g. bar coding) technology, and allows wireless scanners to integrate and provide job-specific status for all products in production. Specific labels may be printed from laser printers on the shop floor allowing for shipping and receiving to clearly track materials. The production management system allows for scanning of identification cards, as well as for selection and tracking of production tasks. The production management system also enables loose material tracking, and panel exception management.

A workforce management subsystem provides detailed project and task time tracking to manage labor requirements. For example, badge swiping cards provide accurate clock-in and clock-out times. The workforce management subsystem allows for creation and modification of employee information, such as job type (e.g., picker, assembler, welder, sheather, material handler, maintenance, stager, shipper, or other), employee type (e.g., plant employee, plant supervisor, office staff), and other employee information. The workforce management subsystem may track employee's time, and calculate information for payroll, based on the time records. The workforce management subsystem may provides an interface to an employee time manager kiosk that allows employees to check in before and out after each shift. The workforce management subsystem also can be used to track productivity, by comparing the work completed by an employee in the time that he or she is at work in the plant.

A shipping subsystem controls movement of panels through the loading and shipping process. A loading module may provide real-time information about the projects that are loaded. A display of each trailer may show the locations of the panels. A shipping module may display all unique loads shipped with date, time, and trailer number. It also may display panel count for the trailer.

An invoicing subsystem manages and controls invoices on a contract-by-contract basis. Invoices related to construction projects may be billed on a percentage of completion basis, and may be managed such that the design, supply, and installation are billed as separate milestones. In one embodiment, the invoicing subsystem can break out the separate aspects of the design portion (e.g., signing of a proposal, submission of permit drawings, and submission of shop drawings), the supply portion (e.g., blocks, levels, walls, floors, and roof), and the install portion (e.g., blocks, levels, walls, floors, and roof installation, and in some cases a breakdown between stick framing and interior). On a regular interval, the invoicing subsystem can provide an accounting for a project and issue appropriate invoices.

A business analytics subsystem may provide information for a status report regarding the operation of the manufacturing facility. An exemplary production report is as shown in TABLE 1 below. As can be seen from the exemplary report, it may include the number of employees that are working, and where those resources are deployed. In can provide statistics on the status of the work performed, and the panels that have been picked, pre-welded, assembled at GFT, post-welded, sheathed, staged, and loaded.

TABLE 1

This Report was Generated and E-mailed by GEM 11/20/2006 2:58:08 PM Morning Shift Stats

| | |
|---|---|
| Employees Signed In: | 29 |
| Panels | |
| *Manufacturing Index: | 980* |
| Panel Employees: | 18 |
| Picked: | 86\|2.6 men |
| Pre-Welding: | 68\|2.44 men |
| GFT: | 99\|7.53 men |
| Post-Welding: | 85\|3.57 men |
| Sheathing: | 9\|1 men |
| Staged: | 101\|1748 pcs\|1.41 men |
| Loaded: | 156\|3011 pcs\|0.47 men |
| Current HPU: | 1.56 |
| Current MPP: | 5.4 |
| Area Produced: | 541 sq. M (5823.28 sq. ft.) |
| Weight Produced: | 4329 Kg (9543.81 lbs.) |
| GFT: | |
| Table 1: | 19\|389 pcs\|934.52 sq. ft.\|1793.13 lbs. |
| Table 2: | 26\|491 pcs\|1111.48 sq. ft.\|2919.23 lbs. |
| Table 3: | 19\|279 pcs\|954.01 sq. ft.\|1621.41 lbs. |
| Table 4: | 35\|599 pcs\|1358.73 sq. ft.\|3114.43 lbs. |
| Staged: | |
| Brentcliff Stacked Towns (Hyde Park Phase 4 and 5): | 101 |
| Loaded: | |
| Aspen Heights Building B: | 1 on #52186 |
| Aspen Heights Building B: | 1 on #573028 |
| Brentcliff Stacked Towns (Hyde Park Phase 4 and 5): | 25 on #488821 |
| Brentcliff Stacked Towns (Hyde Park Phase 4 and 5): | 49 on #488822 |
| Brentcliff Stacked Towns (Hyde Park Phase 4 and 5): | 78 on #573022 |

TABLE 1-continued

Quality Control

| Panels Checked: | 0 |
| --- | --- |
| Pass: | 0 |
| Fail\Rework: | 0 |

Trusses

| Truss Employees: | 4 |
| --- | --- |
| Cutting: | 8 h 55 m |
| GTT: | 77 |
| Staged: | 79 |
| Loaded: | 0 |
| Current HPU: | 0.79 |
| GTT: | |
| Table 1: | 48 |
| Table 2: | 29 |
| Staged: | |
| Brentcliff Stacked Towns (Hyde Park Phase 4 and 5): | 79 |
| Loaded: | |

Other

| Other Employees: | 3 |
| --- | --- |
| Hours: | 28 h 14 m |

Employees Not Scanned Into C4, T1, or Other:

| Employee Name | Signed In | Signed Out |
| --- | --- | --- |
| A | 05:32 AM | 12:30 PM |
| B | 05:32 AM | |
| C | 05:37 AM | |
| D | 05:52 AM | |
| E | 05:52 AM | |

Other exemplary reports that may be provided by the business analytics subsystem include workforce management (e.g., employees per day, total labor hours, hourly labor per project, employee time daily report, and project list), manufacturing analytics (e.g., amounts that have been: picked, pre-welded, GFT, post-welded, sheathed, staged, loaded; statistics such as HPU and MPP/Day; allocations of workers by job type; and pieces staged), process analytics (e.g., employee production, build production, employee productivity, project report, product process, drawings issued, panels process report, and panels loaded/shipped), management controls (e.g., orders not received, received not picked, staged not loaded, and incomplete panels), and job costing (e.g., cost per panel, project cost, and category cost). Real-time notifications also may be provided, for example by email to designated distribution lists.

Figure 20:
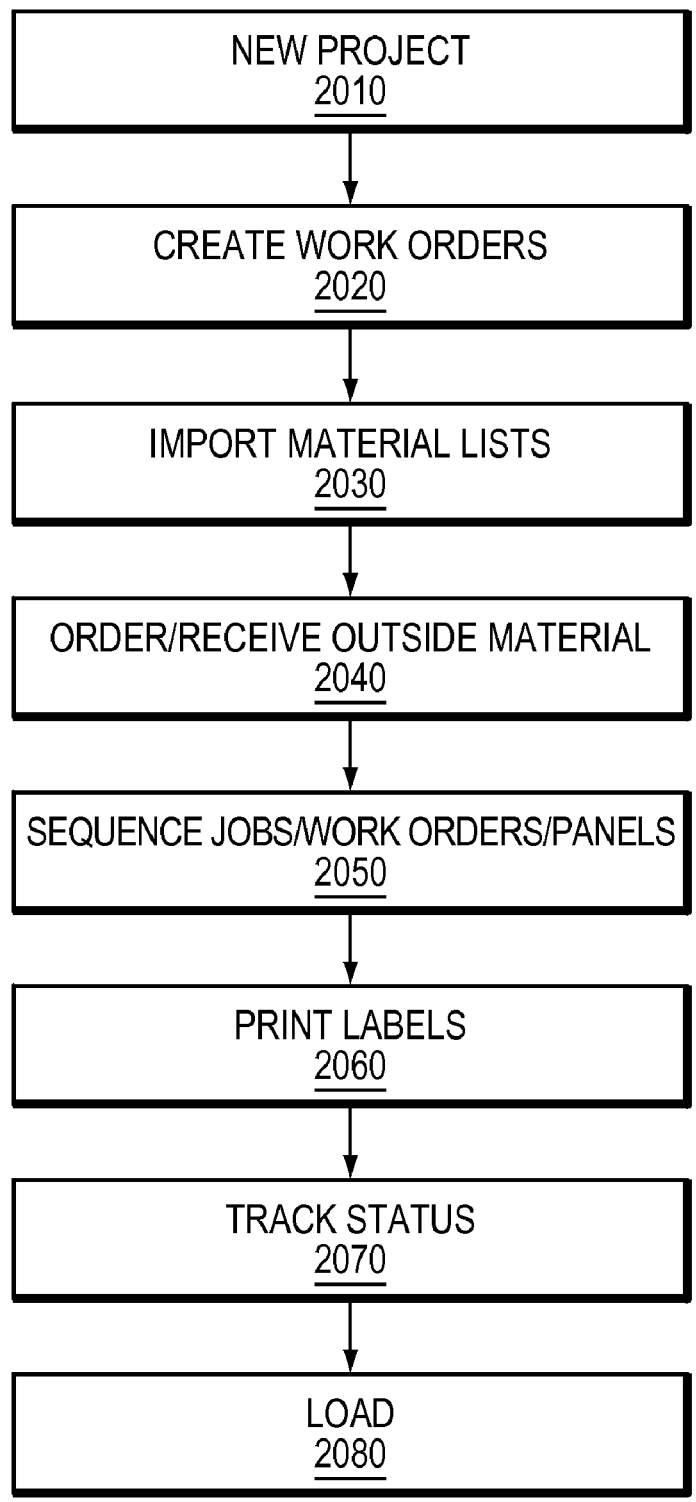
FIG. 20 is a flowchart of a method, in accordance with one embodiment of the invention.

Referring to FIG. 20, a process for the operation of a manufacturing facility using a management system as just described begins with the configuration of a new project (STEP 2010). This may be accomplished, for example, using the system administration subsystem. This may be accomplished, for example, by a project manager. The project manager can create the new project, and provide all contact information and other details.

When the project has been created, the project manager may then Icreate work orders (STEP 2020). This may be accomplished, for example, by a project manager. This may be accomplished, for example, using the order management subsystem. The order management system may be used to create work orders, and specify lots of panels, levels, and phases for the project. The project manager may make use of information provided by a design system. For example, the project manager may create the work orders and then import material lists (STEP 2030) for the work orders, based on the information from the design system. In this way, the project manager can quickly specify accurately the materials that are needed to fill the work order.

Once the work orders have been created, then the material for the jobs can be ordered (STEP 2040). This may be accomplished, for example, by purchasing or accounting personnel. This may be accomplished, for example, by using the purchase order subsystem described above. An export file may be created in a vendor-specific format.

Work orders and/or panels may be released to the ordering process, and when the materials arrive, they may be received into the production management system. For example, receiving department personnel may indicate that the material is now available for production.

When the material is available, and the timing is appropriate, the jobs, work orders, and panels may be sequenced and scheduled (STEP 2050). This may be accomplished, for example, by a production or project manager. This may be accomplished, for example, using a production management subsystem as described above. As the jobs come up for manufacture, they will be provided to the manufacturing personnel.

When the parts needed for the assembly, including parts that are manufactured by machines and parts that were purchased from outside vendors, and it is the panel's turn in the sequence, it is ready for assembly. Labels will be printed for that panel (STEP 2060), and kept with, or affixed to, the collection of parts. This may be accomplished, for example, by a picker, or other line worker. This may be accomplished, for example, using the production management subsystem as described. By generating the labels dynamically with the picking of the components, it is possible to change the sequence in which future panels will be manufactured at any time.

Throughout the production process, the manufacture of the panels may be monitored and information provided to plant management (STEP 2070). This may be accomplished, for example, by plant management, such as a production or project manager. This may be accomplished, for example, using a business analytics subsystem as described above.

Following production, the staged panels may be loaded to trailers, as well as any additional loose materials (STEP 2080). Bills of lading and shipping lists may be created. This may be accomplished, for example, by shipping personnel. This may be accomplished, for example, using the shipping subsystem described above.

Additional tasks that may be performed are job costing (at the front end) and accounting and invoicing as the project proceeds.

It should be understood that alternative embodiments, and/or materials used in the construction of embodiments, or alternative embodiments, are applicable to all other embodiments described herein.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A process for managing the assembly of a panel for use in steel frame building construction, comprising:
   receiving structure design information from a computer aided design tool;

providing information for the selection and collection of components for the panel, the component selection information being generated in a printable format from a panel library;

substantially simultaneously with the collection of the components, providing an information label associated with at least one component of the panel;

providing, at an assembly station, assembly instructions for the collected components of the panel, the assembly instructions being generated in a printable format; and tracking the location and stage of construction of the panel through a manufacturing process.

2. The process of claim 1, wherein the component selection information comprises at least one of a fabrication drawing and a bill of materials.

3. The process of claim 1, wherein the information labels comprise construction information.

4. The process of claim 3, wherein the construction information comprises at least one of part number information, assembly information, tracking information, job number information, bar code information, panel information, geometrical information, user information, and combinations thereof.

5. The process of claim 4, wherein the tracking step comprises entering construction information info an information technology system.

6. The process of claim 5, wherein the information technology system comprises a plurality of user interface terminals.

7. The process of claim 6, wherein the plurality of user interface terminals are associated with a plurality of workstations on an assembly line.

8. The process of claim 6, wherein the information technology system provides further construction information to a user in response to the entering of construction information into a user interface terminal.

9. The process of claim 6, wherein the plurality of user interface terminals comprise at least one of a barcode reader, a touch sensitive screen, a computer terminal, a printer, and combinations thereof.

* * * * *